United States Patent
Kim et al.

(10) Patent No.: US 12,422,982 B2
(45) Date of Patent: Sep. 23, 2025

(54) STORAGE SYSTEM AND METHOD OF DATA MANAGEMENT OF THE SAME

(71) Applicant: SAMSUNG ELECTRONICS CO., LTD., Suwon-si (KR)

(72) Inventors: Junghoon Kim, Suwon-si (KR); Hyuntae Kim, Suwon-si (KR); Hojin Ahn, Suwon-si (KR); Jihun You, Suwon-si (KR); Doogie Lee, Suwon-si (KR); Yeni Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/207,373

(22) Filed: Jun. 8, 2023

(65) Prior Publication Data

US 2024/0126435 A1    Apr. 18, 2024

(30) Foreign Application Priority Data

Oct. 13, 2022   (KR) .................. 10-2022-0131543

(51) Int. Cl.
*G06F 3/06* (2006.01)
(52) U.S. Cl.
CPC ............ *G06F 3/0608* (2013.01); *G06F 3/064* (2013.01); *G06F 3/0652* (2013.01); *G06F 3/0679* (2013.01)
(58) Field of Classification Search
CPC ...... G06F 3/0608; G06F 3/064; G06F 3/0652; G06F 3/0679; G06F 12/0246; G06F 2212/1016; G06F 2212/1041; G06F 2212/261
USPC .................................................. 711/103, 102
See application file for complete search history.

(56) References Cited

U.S. PATENT DOCUMENTS

| | | |
|---|---|---|
| 6,373,803 B2 | 4/2002 | Ando et al. |
| 7,380,064 B2 | 5/2008 | Murotani et al. |
| 7,680,830 B1 | 3/2010 | Ohr et al. |
| 8,842,472 B2 | 9/2014 | Kim |
| 9,519,647 B2 | 12/2016 | Batwara et al. |
| 10,089,481 B2 | 10/2018 | Hasegawa et al. |
| 10,846,019 B2 | 11/2020 | Kim et al. |
| 11,133,941 B2 | 9/2021 | Khosravi et al. |

(Continued)

FOREIGN PATENT DOCUMENTS

| | | |
|---|---|---|
| JP | 20090086868 A | 4/2009 |
| JP | 6215401 B1 | 10/2017 |

*Primary Examiner* — Hosain T Alam
*Assistant Examiner* — Zubair Ahmed
(74) *Attorney, Agent, or Firm* — Sughrue Mion, PLLC

(57) ABSTRACT

A storage system includes a host device including a file system configured to set a plurality of block expiration times respectively corresponding to a plurality of data blocks included in a file, and a storage device configured to store data according to control of the host device. The storage device includes a nonvolatile memory device configured to store the plurality of data blocks provided from the host device, a storage timer configured to provide a count value by counting time, and a data deletion manager. The data deletion manager generates a data deletion information table including a plurality of block deletion times based on the plurality of block expiration times provided from the host device. The data deletion manager deletes each data block of the plurality of data blocks stored in the nonvolatile memory device based on the data deletion information table and the count value.

18 Claims, 20 Drawing Sheets

(56) References Cited

U.S. PATENT DOCUMENTS

| | | | |
|---|---|---|---|
| 2003/0028652 A1 | 2/2003 | Bardini et al. | |
| 2006/0282457 A1* | 12/2006 | Williams | H03M 7/30 |
| | | | 707/999.102 |
| 2009/0119469 A1 | 5/2009 | Dellantoni et al. | |
| 2011/0072194 A1* | 3/2011 | Forhan | G06F 12/0246 |
| | | | 711/170 |
| 2013/0275391 A1* | 10/2013 | Batwara | G06F 16/125 |
| | | | 707/689 |
| 2019/0171393 A1* | 6/2019 | Kim | G06F 12/0246 |
| 2020/0042250 A1* | 2/2020 | Oh | G06F 3/0611 |
| 2020/0133834 A1* | 4/2020 | Muchherla | G06F 3/0616 |
| 2021/0124718 A1 | 4/2021 | Hattori | |

\* cited by examiner

STORAGE SYSTEM AND METHOD OF DATA MANAGEMENT OF THE SAME

CROSS-REFERENCE TO RELATED APPLICATION

This application is based on and claims priority under 35 USC § 119 to Korean Patent Application No. 10-2022-0131543, filed on Oct. 13, 2022, in the Korean Intellectual Property Office (KIPO), the disclosure of which is incorporated by reference herein in its entirety.

BACKGROUND

1. Field

Example embodiments of the disclosure relate generally to semiconductor integrated circuits, and more particularly to a storage device, a storage system and a method of data management of a storage system.

2. Discussion of the Related Art

According to a data management method of a storage system, after data is stored in a nonvolatile memory device of a storage device, the stored data is maintained until overwrite or deletion is performed under the control of a host device. If a user or a client of the storage device no longer uses the stored data, the storage device stores unnecessary data and storage capacity is wasted. Moreover, data that is stored unnecessarily stored data shortens the lifespan of the storage device and reduces the performance of the storage device by increasing program-erase cycles through garbage collection or the like. In addition, for data security, data stored in a storage device needs to be deleted after a certain period of time has elapsed.

SUMMARY

Some example embodiments may provide a storage device, a storage system including a storage device and a method of data management of a storage system, capable of enhancing the performance of the storage system.

According to an aspect of the disclosure, there is provided a storage system including: a host device configured to set a plurality of block expiration times respectively corresponding to a plurality of data blocks in a file; and a storage device configured to store data, the storage device including: a nonvolatile memory device configured to store the plurality of data blocks from the host device; a storage timer configured to provide a count value by counting time; and a data deletion manager configured to: generate a data deletion information table including a plurality of block deletion times for deleting the plurality of data blocks based on the plurality of block expiration times from the host device, and delete each of the plurality of data blocks stored in the nonvolatile memory device based on the data deletion information table and the count value.

According to an aspect of the disclosure, there is provided a storage device including: a nonvolatile memory device configured to store a plurality of data blocks in a file from a host device; a storage timer configured to provide a count value by counting time; and a data deletion manager configured to: generate a data deletion information table including a plurality of block deletion times for deleting the plurality of data blocks based on a plurality of block expiration times from the host device, and delete each of the plurality of data blocks stored in the nonvolatile memory device based on the data deletion information table and the count value.

According to an aspect of the disclosure, there is provided a method of data management of a storage system, including: setting, by a host device, a plurality of block expiration times respectively corresponding to a plurality of data blocks in a file; storing the plurality of data blocks in a nonvolatile memory device of a storage device; obtaining a count value based on counting time; generating a data deletion information table including a plurality of block deletion times for deleting the plurality of data blocks based on the plurality of block expiration times; and deleting each of the plurality of data blocks stored in the nonvolatile memory device based on the data deletion information table and the count value.

The storage device, the storage system and the method of data management according to example embodiments may enhance performance and lifetime of the storage system by deleting the expired data by units of data block efficiently and automatically without the control of the host device.

BRIEF DESCRIPTION OF THE DRAWINGS

Example embodiments of the present disclosure will be more clearly understood from the following detailed description taken in conjunction with the accompanying drawings.

DETAILED DESCRIPTION

Figure 1:
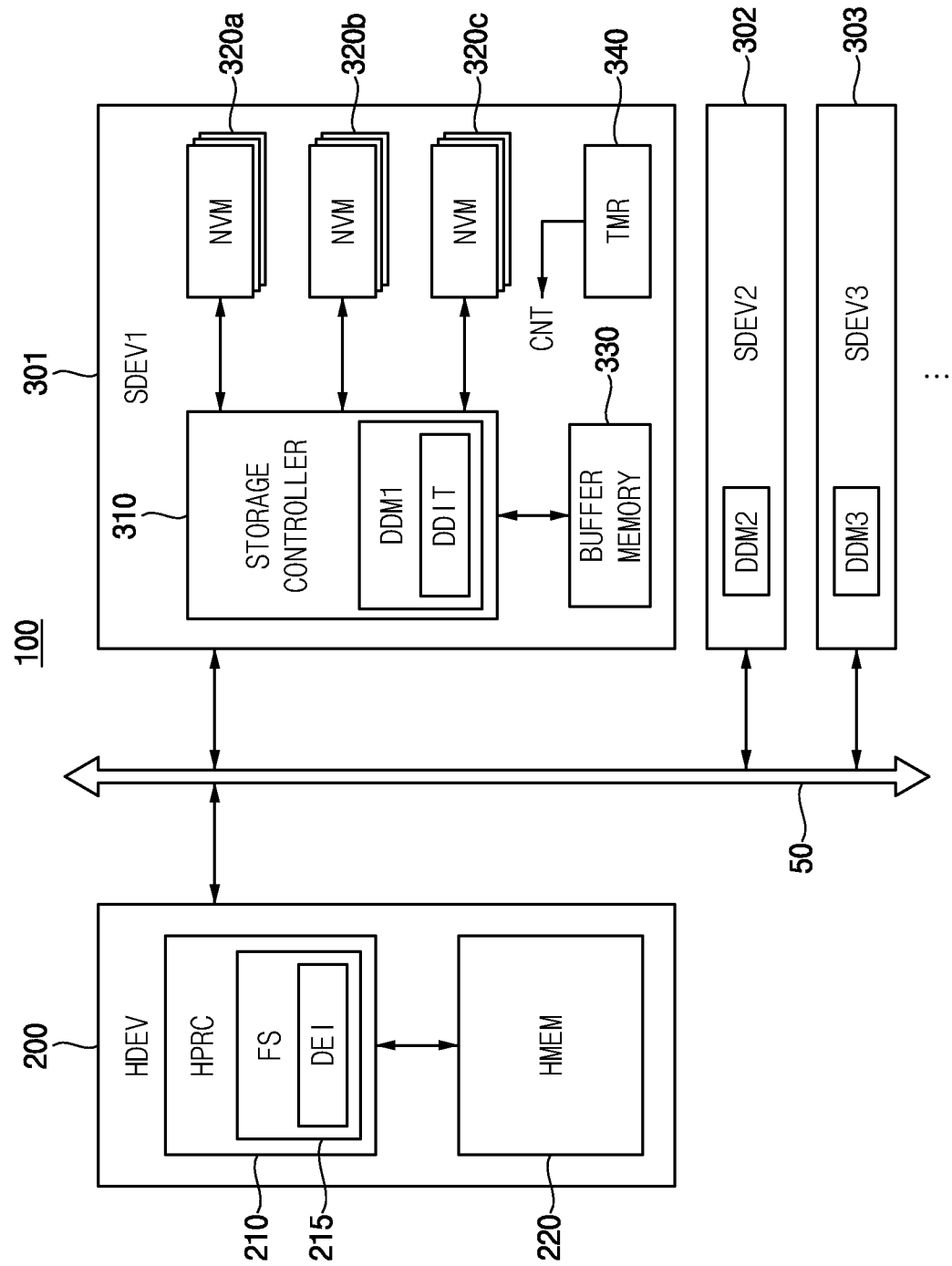
FIG. 1 is a block diagram illustrating a storage system according to example embodiments.

Various example embodiments will be described more fully hereinafter with reference to the accompanying drawings, in which some example embodiments are shown. In the drawings, like numerals refer to like elements throughout. The repeated descriptions may be omitted.

Figure 2:
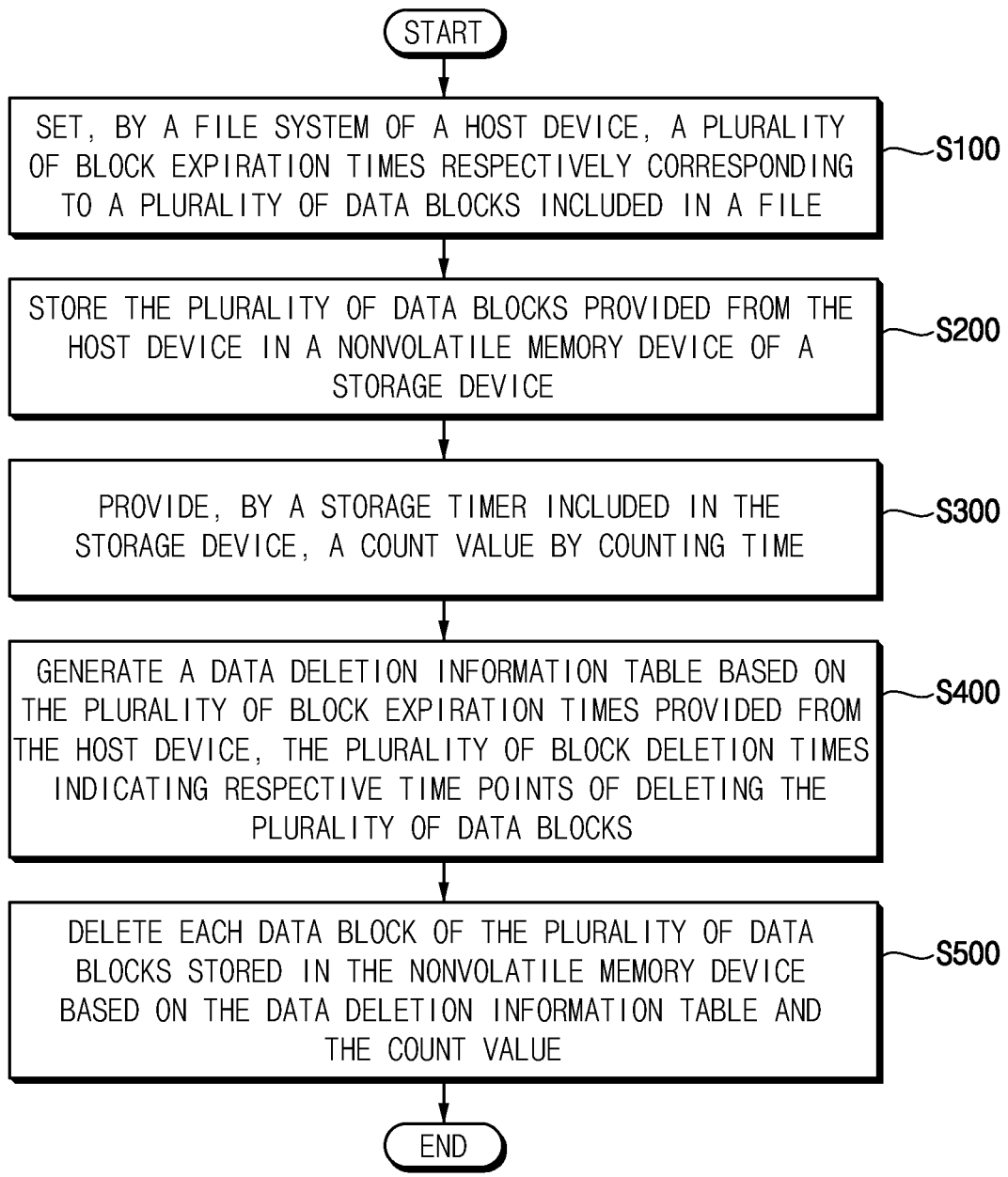
FIG. 2 is a flowchart illustrating a method of data management of a storage system according to example embodiments.

FIG. 1 is a block diagram illustrating a storage system according to example embodiments, and FIG. 2 is a block diagram illustrating a storage system including a storage device according to example embodiments.

Referring to FIG. 1, a storage system 100 includes a host device HDEV 200 and one or more storage devices SDEV1 301, SDEV2 302 and SDEV3 303.

The host device 200 and the storage devices 301, 302 and 303 may be connected to an interconnector 50 and communicate signals and/or data through the interconnector 50. For example, the host device 200 transmit signals and/or data through the interconnector 50 to any of the storage devices 301, 302 and 303 and the host device 200 receive signals and/or data through the interconnector 50 transmitted by any of the storage devices 301, 302 and 303. The interconnector 50 may be referred to as a network fabric. The interconnector 50 may be implemented with any suitable networking protocol and/or medium, such as Ethernet, Fiber Channel, InfiniBand, etc., Moreover, the interconnector 50 may be implemented either directly or through intermediary devices such as switches, hubs, etc., which may be part of interconnector 50. The interconnector 50 may be implemented with any other communication or interconnect protocol that may enable communication between the host device 200 and the storage devices 301, 302 and 303, such as PCIe (peripheral component interconnect express), SATA (Serial ATA), SAS (Serial Attached SCSI), OcuLink, etc.

According to an example embodiment, the host device 200 may control overall operations of the storage system 100. The host device 200 may include a host processor (HPRC) 210 and a host memory (HMEM) 220.

The host processor 210 may control an operation of the host device 200. For example, the host processor 210 may execute an operating system (OS). According to an example embodiment, the host device 200 may include a file system FS 215. The file system FS 215 may be implemented as software and a portion of the OS as will be described below with reference to FIG. 3. The host processor 210 may execute various applications running on the OS. The host processor 210 may be a homogeneous multi-core processor or a heterogeneous multi-core For example, host processor 210 may be a processor that includes at least two processor cores independently executing program instructions.

The host memory 220 may store instructions and/or data that are executed and/or processed by the host processor 210. For example, the OS or applications may be loaded into the host memory 220 during booting. For example, when the storage system 100 boots, the OS stored in one of the storage devices 301, 302 and 303 may be loaded into the host memory 220, and then applications may be loaded by the OS into the host memory 220.

FIG. 1 illustrates three storage devices for convenience of illustration and description, and example embodiments are not limited to a particular number of storage devices. As such, the storage system 100 may include more than three storage devices or less than three storage devices. In some example embodiments, the storage system may include a single storage device. Hereinafter example embodiments are described based on the one storage device 301, and the other storage device 302 and 303 may have the same or similar configuration.

According to an example embodiment, the storage device 301 may be accessed by the host device 200. For example, the storage device 301 is communicably coupled to the host device 200. The storage device 301 may include a storage controller 310, a plurality of nonvolatile memories (NVM) 320a, 320b and 320c, a buffer memory 330 and a storage timer TMR 340.

The storage controller 310 may control an operation of the storage device 301. For example, controller 310 may control a data write operation and/or a data read operation, based on a command and data that are received from the host device 200. However, the disclosure is not limited thereto, and as such, the storage controller 310 may control other operations of the storage device 301 according to an example embodiment.

The plurality of nonvolatile memories 320a, 320b and 320c may store a plurality of data. For example, the plurality of nonvolatile memories 320a, 320b and 320c may store the meta data, various user data, or the like.

In some example embodiments, each of the plurality of nonvolatile memories 320a, 320b and 320c may include a NAND flash memory. In other example embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

The buffer memory 330 may store instructions executed by the storage controller 310 and/or data processed by the storage controller 310. According to an example embodiment, the buffer memory 330 may temporarily store data stored in the plurality of nonvolatile memories 320a, 320b and 320c or may temporarily store data to be stored into the plurality of nonvolatile memories 320a, 320b and 320c. For example, the buffer memory 330 may include at least one of various volatile memories, e.g., a static random access memory (SRAM), a DRAM, or the like.

In some example embodiments, the storage device 301 may be a universal flash storage (UFS). In other example embodiments, the storage device 301 may be a solid state drive (SSD), a multi-media card (MMC) or an embedded multi-media card (eMMC). In still other example embodiments, the storage device 301 may be one of a secure digital (SD) card, a micro SD card, a memory stick, a chip card, a universal serial bus (USB) card, a smart card, a compact flash (CF) card, or the like.

In some example embodiments, the storage device 301 may be connected to the host device 200 through the interconnector 50 which may include, for example, a UFS, an eMMC, a serial advanced technology attachment (SATA)

bus, a nonvolatile memory express (NVMe) bus, a serial attached SCSI (SAS) bus, or the like.

The storage device 301 may include a data deletion manager DDM1. The other storage devices 302 and 303 may include data deletion managers DDM2 and DDM3, respectively. FIG. 1 illustrates that the data deletion manager DDM1 is included in the storage controller 310. In some example embodiments, the data deletion manager DDM1 may be implemented as independent hardware logic distinct from the storage controller 310. For example, the data deletion manager DDM1 may be external to the storage controller 310 according to another example embodiment.

Referring to FIGS. 1 and 2, according to an example embodiment, in operations S100, a plurality of block expiration times respectively corresponding to a plurality of data blocks included in a file may be set by the file system FS of the host device 200. The plurality of block expiration times may be referred to as data expiration information DEL. In general, a file system manages a file by dividing the file into data blocks of a predetermined size. The size of the data block may be determined variously, such as 4 KB (Kilo Byte), 8 KB, 16 KB, and so on.

In operation S200, the storage device 301 may store the plurality of data blocks provided from the host device 200 in the nonvolatile memory device NVM of the storage device 301 (S200). Example embodiments of configurations and operations of the storage device 301 will be described below with reference to FIGS. 18 through 21.

In operation S300, the storage timer TMR 340 included in the storage device 301 may count time to provide a count value CNT. The configuration of the storage timer TMR 340 may be implemented variously and accordingly the count value CNT may represent various time information. In some example embodiments, as will be described below with reference to FIG. 10, the storage timer TMR 340 may initialize the count value CNT to zero when the storage device 301 is powered on to start counting time from a time point when the storage device 301 is powered on In operation S400, the data deletion manager DDM1 may generate a data deletion information table DDIT based on the plurality of block expiration times. For example, the data expiration information DEI is provided from the host device 200, and the plurality of block deletion times indicate respective time points of deleting the plurality of data blocks. Example embodiments of generating the data deletion information table DDIT will be described below with reference to FIGS. 11 and 12.

In operation S500, the data deletion manager DDM1 may delete each data block of the plurality of data blocks stored in the nonvolatile memory device NVM based on the data deletion information table DDIT and the count value CNT. Example embodiments of deleting each data block will be described below with reference to FIGS. 13 through 15.

Accordingly, the storage device 301, the storage system 100 and the method of data management according to example embodiments may enhance performance and lifetime of the storage system 100 by deleting the expired data by units of data block efficiently and automatically without the control of the host device 200.

Figure 3:
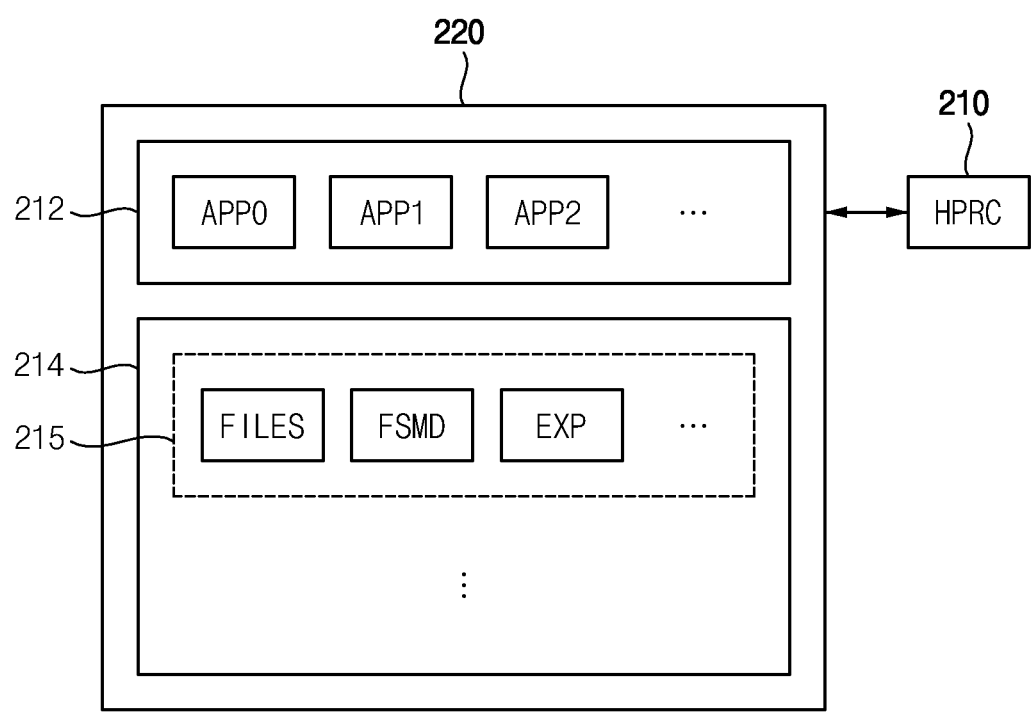
FIG. 3 is a diagram illustrating a file system implemented in a storage system according to example embodiments.

FIG. 3 is a diagram illustrating a file system implemented in a storage system according to example embodiments.

FIG. 3 illustrates a software structure of the storage system 100 shown in FIG. 1. Referring to FIG. 3, a software layer structure of the storage system 100 loaded into the host memory 220 and driven by the host processor 210 may be divided into an application program 212 and a kernel 214 of the operating system (OS). The OS may further include one or more device drivers to manage various devices such as a memory, a modem, and an image processing device, etc.

The application program 212 may be upper layer software driven as basic service or driven by a user's request. A plurality of application programs APP0, APP1 and APP2 may be executed to provide various services. According to an embodiment, a plurality of application programs APP0, APP1 and APP2 may be simultaneously executed to provide various services. The application programs APP0, APP1 and APP2 may be executed by the host processor 210 after being loaded into the host memory 220.

The kernel 214, as a component of the OS, performs a control operation between the application program 212 and hardware. The kernel 214 may include program execution, interrupt, multi-tasking, memory management, a file system, and a device driver. The file system 215 associated with example embodiments is described below.

According to an example embodiment, a user space where the application programs 212 are located and a kernel space where the kernel 214 including the file system 215, an input/output scheduler, and a device driver are located may be separated from each other. According to an example embodiment, the application programs 212 cannot directly access a resource such as the storage device 301 of FIG. 1. Instead, the application programs 212 may call a function defined in a library containing a system call function and may request a necessary operation from the kernel 214. When a system call function is called, it can switch from user mode to kernel mode.

The file system 215 may manage files or data stored in the storage device 301. For example, the data may be user data. According to an example embodiment, the file system 215 includes a file allocation table (FAT), a new technology file system (NTFS), a hierarchical file system (HFS), a high performance file system (HPFS), a unix file system (UFS), extended file systems (ext2, ext3, ext4), journaling file system (JFS), ISO 9660, Files-11, veritas file system (VxFS), ZFS, ReiserFS, universal disk format (UDF), and the like. The file system 215 may perform journaling to prevent consistency of databases, files, or data from being maintained due to sudden power off (SPO) or system crash.

The file system 215 may determine a data lifecycle by performing a data expiration policy EXP. The data expiration policy EXP may be implemented by the file system 215 as shown in FIG. 3, or at least a portion of the data expiration policy EXP may be implemented by an application program in the user space. The file system 215 may set a plurality of block expiration times respectively corresponding to a plurality of data blocks included in one file according to the data expiration policy EXP.

While the file system 215 stores data in the nonvolatile memory device NVM of the storage device 301, the file system 215 may create metadata FSMD used for data management, and converts the created metadata FSMD and store the metadata set FSMD as a data structure in the nonvolatile memory device NVM. Also, the file system 215 may store the metadata FSMD in the host memory 220. The file system metadata FSMD may be distinguished from device metadata managed by the storage device 301 for address conversion of the nonvolatile memory device NVM, bad memory blocks, and the like.

Figure 4:
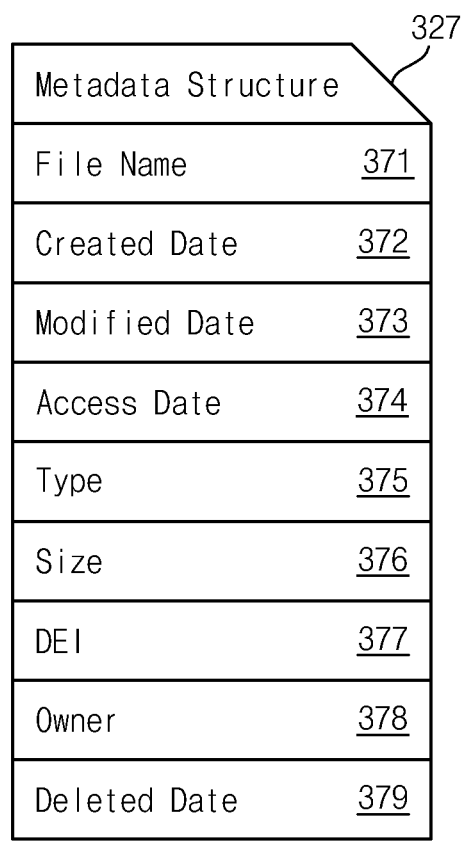
FIG. 4 is a diagram illustrating an example of a metadata structure generated by the file system of FIG. 3.

FIG. 4 is a diagram illustrating an example of a metadata structure generated by the file system of FIG. 3. FIG. 4 illustrates a metadata structure 327 corresponding to a file.

Referring to FIG. 4, a metadata set 327 may include various data fields, such as; a file name 371, a created date 372, a last modified date 373, a last accessed date 374, a file type 375, a file size 376, data expiration information DEI 377, an owner of file 378 and deleted date 379. Here, the term date is used to denote a calendar date and/or time. According to an example embodiment, the file type 375 may include, but is not limited to, an executable file, a document file, a text file, or others)

Figure 5:
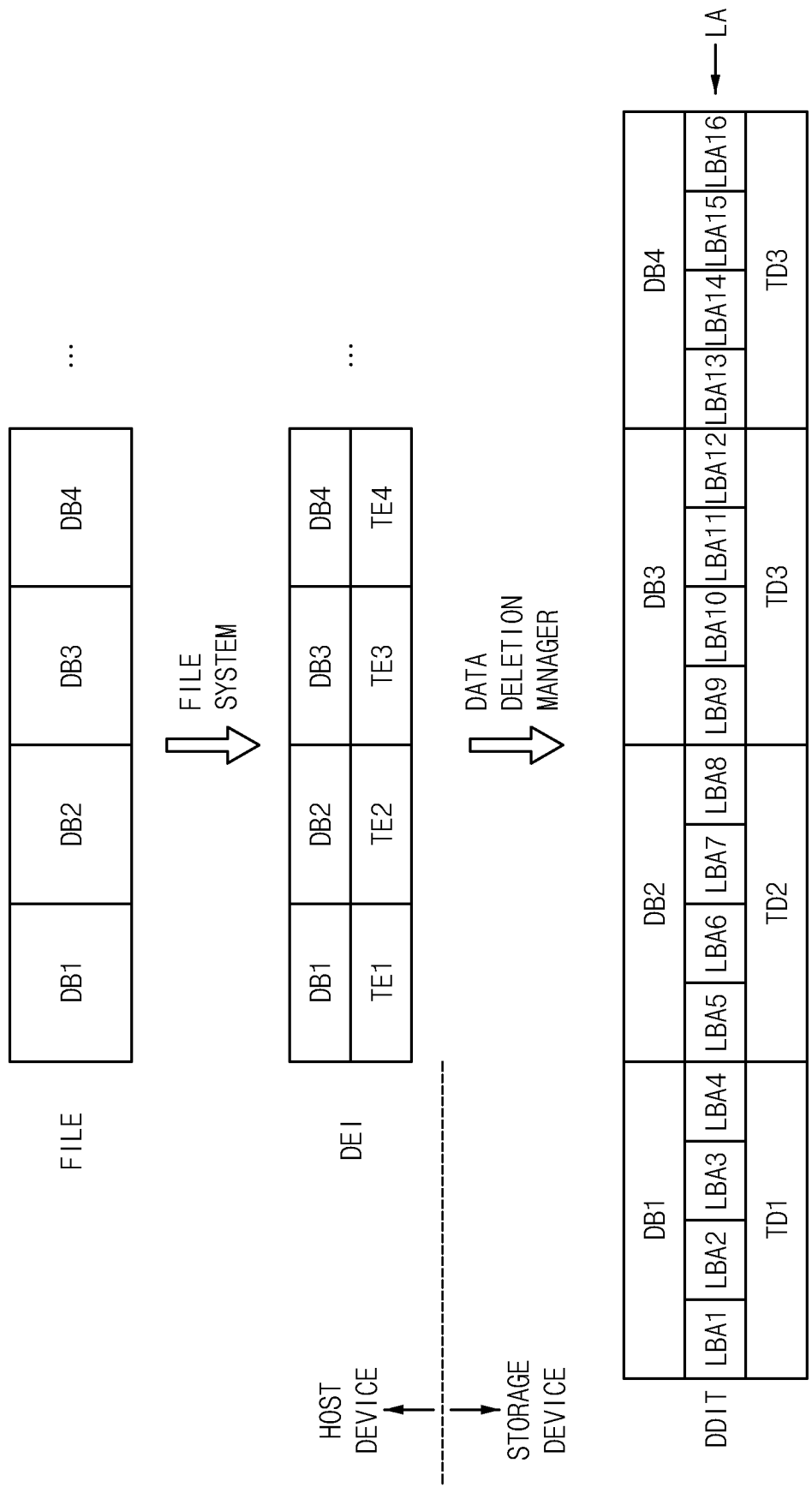
FIG. 5 is a diagram illustrating information in a method of data management of a storage system according to example embodiments.

FIG. 5 is a diagram illustrating information in a method of data management of a storage system according to example embodiments.

Referring to FIGS. 1 and 5, the file system FS of the host device 200 may manage a file by dividing the file into a plurality of data blocks DB1~DB4. FIG. 5 illustrates four data blocks for convenience of illustration and description, and each file may be divided into various number of data blocks. For example, the file may be divided into more than four blocks or less than four blocks.

The file system FS may set a plurality of block expiration times TE1~TE4 respectively corresponding to the plurality of data blocks DB1~DB4 based on a data expiration policy. According to an example embodiment, the data expiration policy may be predetermined. The plurality of block expiration times may be referred to as data expiration information DEI. According to example embodiments, the block expiration time may indicate a timeframe for maintaining the data block, or deletion time point (or date) of the data block.

The host device 200 may transfer the plurality of block expiration times TE1~TE4 to the storage device 301, and the data deletion manager DDM1 of the storage device 301 may generate the data deletion information table DDIT based on the data expiration information DEI or the plurality of block expiration times TE1~TE4.

The data deletion manager DDM1 may store mapping relation between the logic address LA of each data block DBi (i=1, 2, 3, 4) and each block deletion time TDi corresponding to each data block DBi in the data deletion information table DDIT. For example, the logic address LA of the first data block DB1 may correspond to four logic block addresses LBA1~LBA4, the logic address LA of the second data block DB2 may correspond to four logic block addresses LBA5~LBA8, the logic address LA of the third data block DB3 may correspond to four logic block addresses LBA9~LBA12, and the logic address LA of the fourth data block DB4 may correspond to four logic block addresses LBA13~LBA16. FIG. 5 illustrates an example that each data block DBi corresponds to the four logic block addresses. The number of the logic block addresses corresponding to one data block may be determined variously depending on the size of the data block and an offset of the logic block addresses.

The relation between each block expiration time TEi and each block deletion time TDi may be determined according to the type of the block expiration times and the storage timer TMR 340.

In some example embodiments, each block expiration time TEi may indicate a valid usage time of each data block DBi. In this case, the storage timer TMR 340 may provide the count value CNT by initializing the count value CNT to zero when the storage device 301 is powered on to start counting time from a time point when the storage device 301 is powered on. As will be described below with reference to FIGS. 9 and 10, the data deletion manager DDM1 may determine the sum of the accumulated usage time TAU and each block expiration time TEi as each block deletion time TDi.

In some example embodiments, each block expiration time TEi may indicate a deletion time point of each data block DBi. In this case, the storage timer TMR 340 may provide the count value that is synchronized with the time of the host device 200. The data deletion manager DDM1 may determine each block expiration time TEi itself as each block deletion time TDi.

Figure 6:
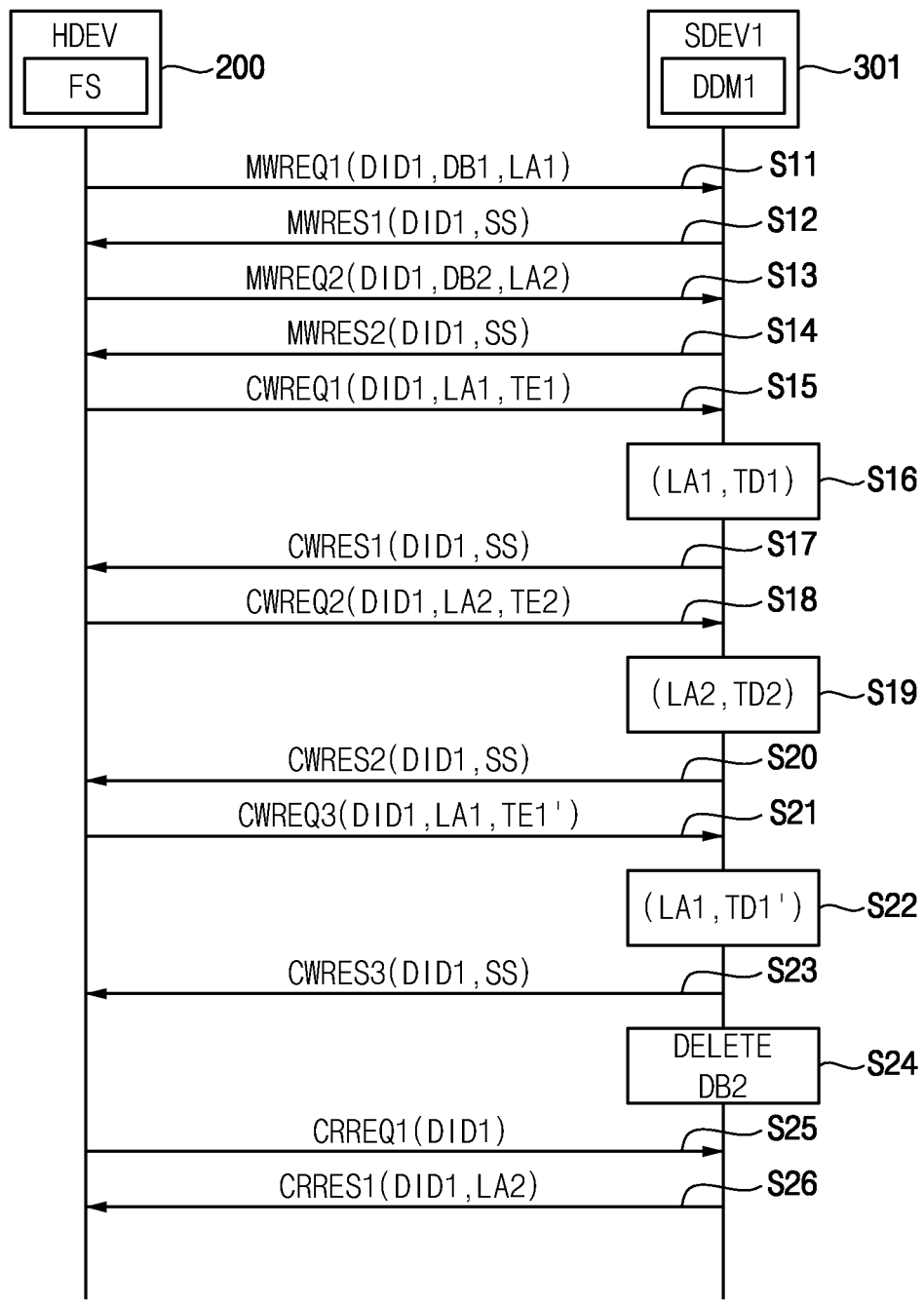
FIGS. 6 and 7 are sequence diagrams illustrating a method of data management of a storage system according to example embodiments.
Figure 7:
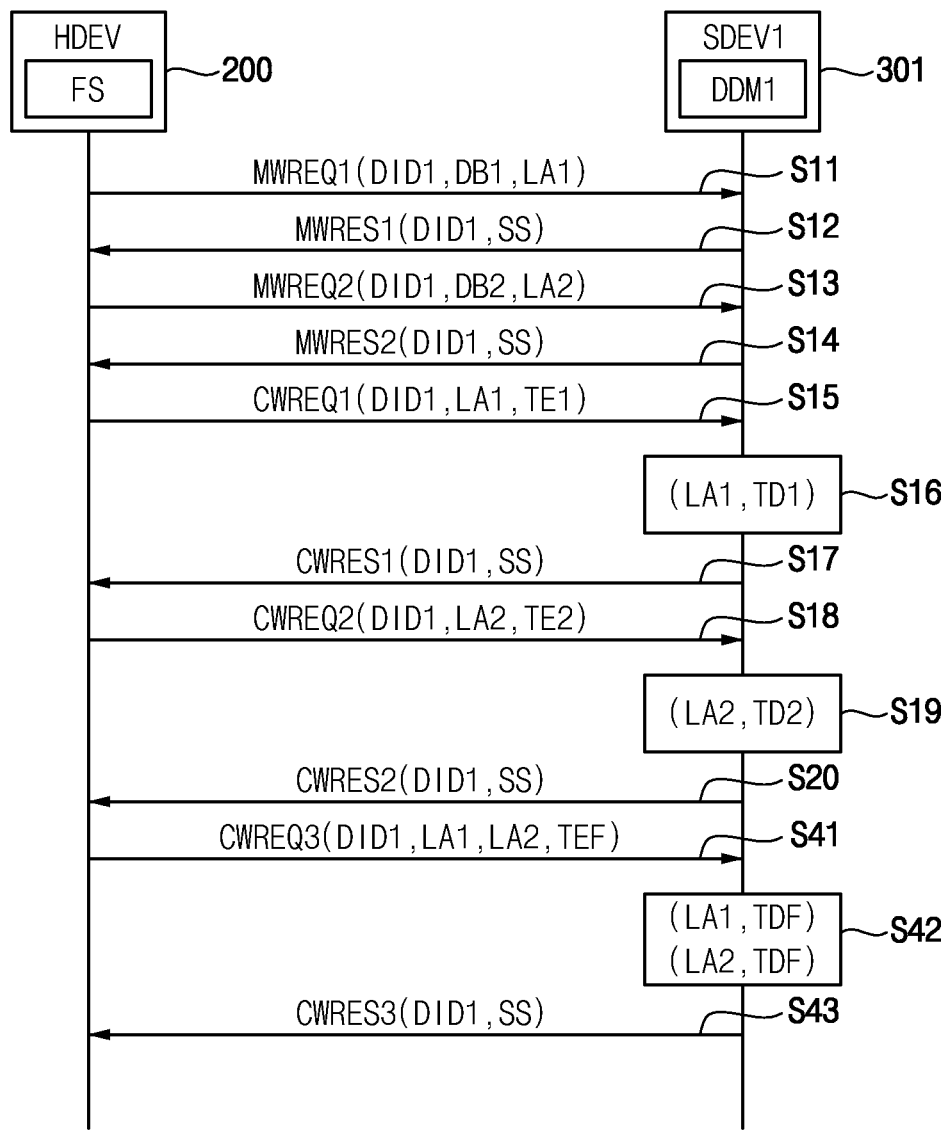

FIGS. 6 and 7 are sequence diagrams illustrating a method of data management of a storage system according to example embodiments. For convenience of illustration and description, FIGS. 6 and 7 illustrate operations with respect to the first data block DB1 and the second data block DB2 included in the file.

Referring to FIGS. 1 and 6, in operation S11, the host device 200 may transfer, to the first storage device 301, a first memory write request MWREQ1. The first memory write request MWREQ1 may include a first device identifier DID1 indicating the first storage device 301, the first data block DB1, and a first logic address LA1 corresponding to the first data block DB1. In operation S12, the first storage device 301 may store the first data block DB1 at the physical address of the nonvolatile memory device corresponding to the first logic address LA1, and transfer, to the host device 200, a first memory write response MWRES1. The first memory write response MWRES1 may include the first device identifier DID1 and write success information SS.

In operation S13, the host device 200 may transfer, to the first storage device 301, a second memory write request MWREQ2 including the first device identifier DID1, the second data block DB2, and a second logic address LA2 corresponding to the second data block DB2. In operation S14, the first storage device 301 may store the second data block DB2 at the physical address of the nonvolatile memory device corresponding to the second logic address LA2, and transfer, to the host device 200, a second memory write response MWRES2 including the first device identifier DID1 and write success information SS.

In operation S15, the host device 200 may transfer, to the first storage device 301, a first configuration write request CWREQ1. The first configuration write request CWREQ1 may include the first device identifier DID1, the first logic address corresponding to the first data block DB1 and a first block expiration time TE1 corresponding to the first data block DB1. In operation S65, the data deletion manager DDM1 of the first storage device 301 may determine a first block deletion time TD1 corresponding to the first block expiration time TE1, and store the mapping relation between the first logic address LA1 and the first block deletion time TD1 in the data deletion information table DDIT. After that, in operation S17, the first storage device 301 may transfer, to the host device 200, a first configuration write response CWRES1. The first configuration write response CWRES1 may include the first device identifier DID1 and write success information SS.

In operation S18, the host device 200 may transfer, to the first storage device 301, a second configuration write request CWREQ2 including the first device identifier DID1, the second logic address corresponding to the second data block DB2 and a second block expiration time TE2 corresponding to the second data block DB2. In operation S19, the data deletion manager DDM1 may determine a second block deletion time TD2 corresponding to the second block expiration time TE2, and store the mapping relation between the second logic address LA2 and the second block deletion time TD2 in the data deletion information table DDIT. After that, in operation S20, the first storage device 301 may transfer, to the host device 200, a second configuration write response CWRES2 including the first device identifier DID1 and write success information SS.

According to an example embodiment, when the file system FS of the host device 200 changes each block expiration time corresponding to each data block, the host device 200 may transfer a request including a new block expiration time corresponding to each data block to the first storage device 301. In this case, the data deletion manager DDM1 may update each block expiration time stored in the data deletion information table DDIT based on the new block expiration time provided from the host device 200.

For example, as illustrated in FIG. 6, when the file system changes the first block expiration time TE1 corresponding to the first data block DB1, in operation S21, the host device 200 may transfer, to the first storage device 301, a third configuration write request CWREQ3 including the first device identifier DID1, the first logic address LA1 and a new block expiration time TE1' corresponding to the first data block DB1. In operation S22, The data deletion manager DDM1 may determine a first new block deletion time TD1' corresponding to the new block expiration time TE1', and store the mapping relation between the first logic address LA1 and the first new block deletion time TD1' in the data deletion information table DDIT. After that, in operation S23, the first storage device 301 may transfer, to the host device 200, a third configuration write response CWRES3 including the first device identifier DID1 and write success information SS.

In operation S24, the data deletion manager DDM1 may delete the second data block DB2 at a time point when the second block deletion time TD2 is elapsed. In operation S25, the host device 200 may transfer periodically or non-periodically, to the first storage device 301, a first configuration read request CRREQ1 including the first device identifier DID1 to inquire information on deleted memory blocks. In operations S26, the first storage device 301 may transfer, to the host device 200, a first configuration read response CRRES1 including the first device identifier DID1 and the second logic address LA2 corresponding the second data block DB2 that has been deleted.

As such, the first storage device 301 may delete the expired data by units of data block efficiently and automatically without the control of the host device 200. The first storage device 301 may transfer the logic address of the deleted data block to the host device 200, and the file system FS of the host device may updates metadata for the file based on the logic address of the deleted data block.

Referring to FIG. 7, the operations S11~S20 of FIG. 7 are the same as the operations S11~S20 of FIG. 6, and the repeated descriptions are omitted.

In some example embodiments, the file system FS may determine one of deletion by units of file and deletion by units of data block. The host device 200 may transfer a request to the first storage device 301 when the file system FS determine the deletion by units of file such that the request includes logic addresses of the plurality of data blocks in the file and a file expiration time corresponding to the file. The data deletion manager DDM1 of the first storage device 301 may replace the plurality of block deletion times stored in the data deletion information table DDIT with the file expiration time when the request including the file expiration time is transferred from the host device For example, as illustrated in FIG. 7, when the file system FS determines the deletion by units of file, in operation S41, the host device 200 may transfer, to the first storage device 301, a third configuration write request CWREQ3 including the first device identifier DID1, the first logic address LA1 corresponding to the first data block DB1, the second logic address LA2 corresponding to the second data block DB2, and a file expiration time TEF. In operation S42, the data deletion manager DDM1 of the first storage device 301 may determine a file deletion time TDF corresponding to the file expiration time TEF, and store the mapping relation between the first logic address LA1 and the file deletion time TDF and the mapping relation between the second logic address LA2 and the file deletion time TDF in the data deletion information table DDIT. After that, in operation S43, the first storage device 301 may transfer, to the host device 200, a third configuration write response CWRES3 including the first device identifier DID1 and write success information SS.

Figure 8:
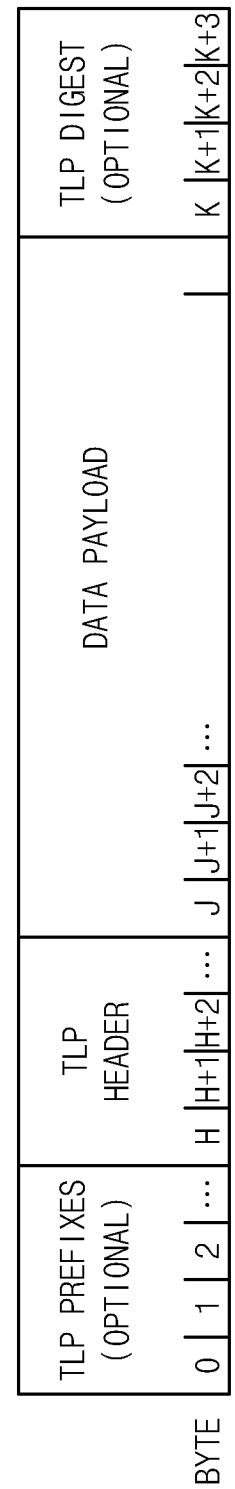
FIG. 8 is a diagram illustrating an example of a packet that is transferred in a storage system according to example embodiments.

FIG. 8 is a diagram illustrating an example of a packet that is transferred in a storage system according to example embodiments.

FIG. 8 illustrates a format of a transaction layer packet (TLP) that is generated and managed by a transaction layer of a PCIe architecture.

The transactions may include requests and completions (or responses), which are communicated using packets. As illustrated in FIG. 8, a TLP may include one or more optional TLP Prefixes, a TLP header, a data payload, and an optional TLP Digest, which are allocated to a plurality of bytes (BYTE 0-k+3).

The memory write request, the memory write response, the configuration write request, the configuration write response, the configuration read request and the configuration read response as described above may correspond to the TLPs as illustrated in FIG. 8. The TLP header may include various information such as a device identifier, success information for the corresponding request and so on, and the data payload may include the data block, the logic address, and the block expiration time and so on.

In some example embodiments, the block expiration time may indicate the valid usage time from a time point when each data block is stored in the nonvolatile memory device while the storage device is in a power-on state to a time point when each data block is deleted from the nonvolatile memory device. In other words, the elapsed time while the storage device is powered off may be excluded from the valid usage time. Hereinafter, example embodiments in case of the block expiration time corresponding to the valid usage time are described with reference to FIGS. 9 through 16.

Figure 9:
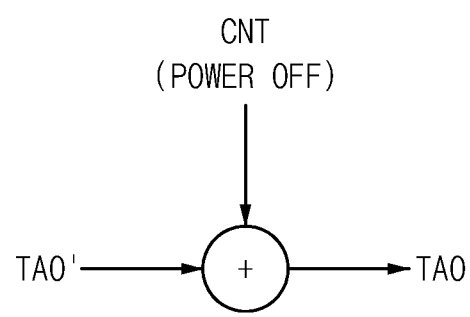
FIGS. 9 and 10 are diagrams for describing an accumulated on time in a method of data management of a storage system according to example embodiments.
Figure 10:
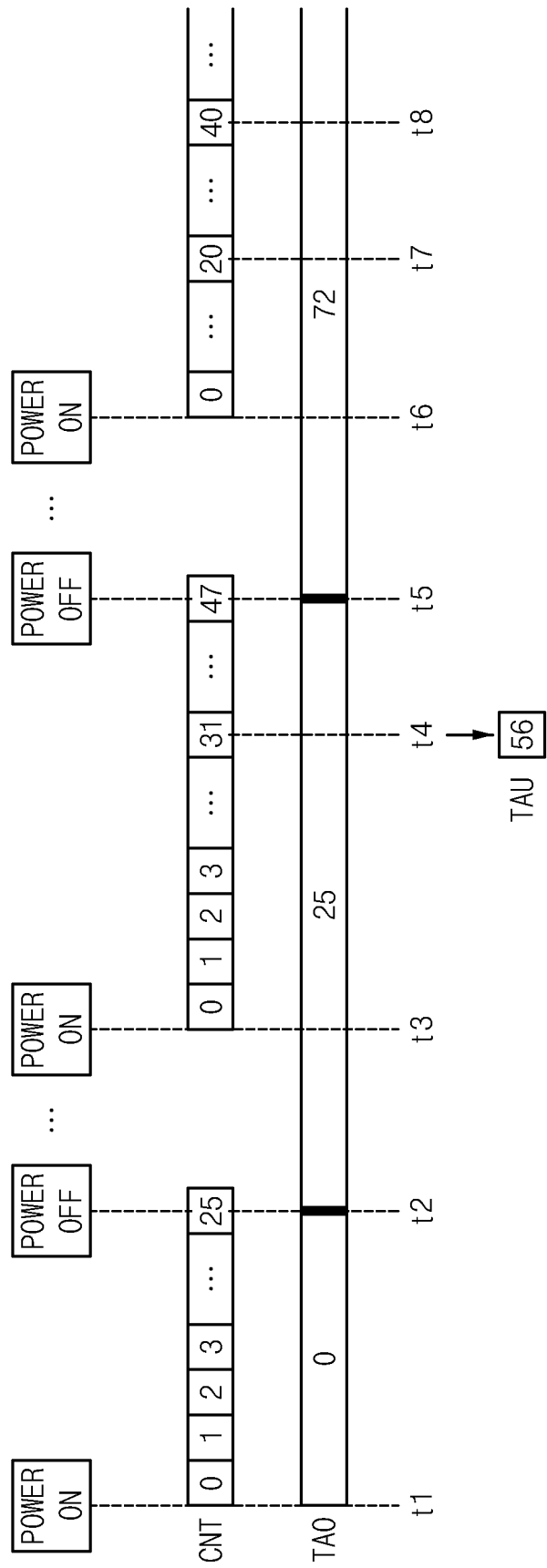

FIGS. 9 and 10 are diagrams for describing an accumulated on time in a method of data management of a storage system according to example embodiments.

Referring to FIGS. 1, 9 and 10, the storage timer TMR 340 may initialize the count value CNT to zero when the first storage device 301 is powered on to start counting time from a time point when the first storage device 301 is powered on. As illustrated in FIG. 10, the storage timer TMR 340 may initialize the count value CNT at each of time points t1, t3 and t6, and provide the count value CNT by resuming the count operation while the first storage device 301 is in a power-on state.

The data deletion manager DDM1 may store an accumulated on time TAO in the data deletion information table DDIT by accumulating the count value CNT when the storage device is powered off. In other words, as illustrated in FIG. 9, the data deletion manager DDM1 may add the count value CNT when the first storage device 301 is powered off to the previous accumulated on time TAO' to store the new accumulated on time TAO. Accordingly, as illustrated in FIG. 10, the accumulated on time TAO may maintain the value of 0 during time interval t1~t2, the value of 25 during time interval t2~t5, and the value of 72 after time point t5 when the first storage device 301 is powered off lastly.

The data deletion manager DDM1 may calculate an accumulated usage time TAU by summing the count value CNT provided from the storage timer TMR 340 and the accumulated on time TAO stored in the data deletion information table DDIT. For example, as illustrated in FIG. 10, the accumulated usage time TAU at time point t4 may be calculated as 31+25=26.

Figure 11:
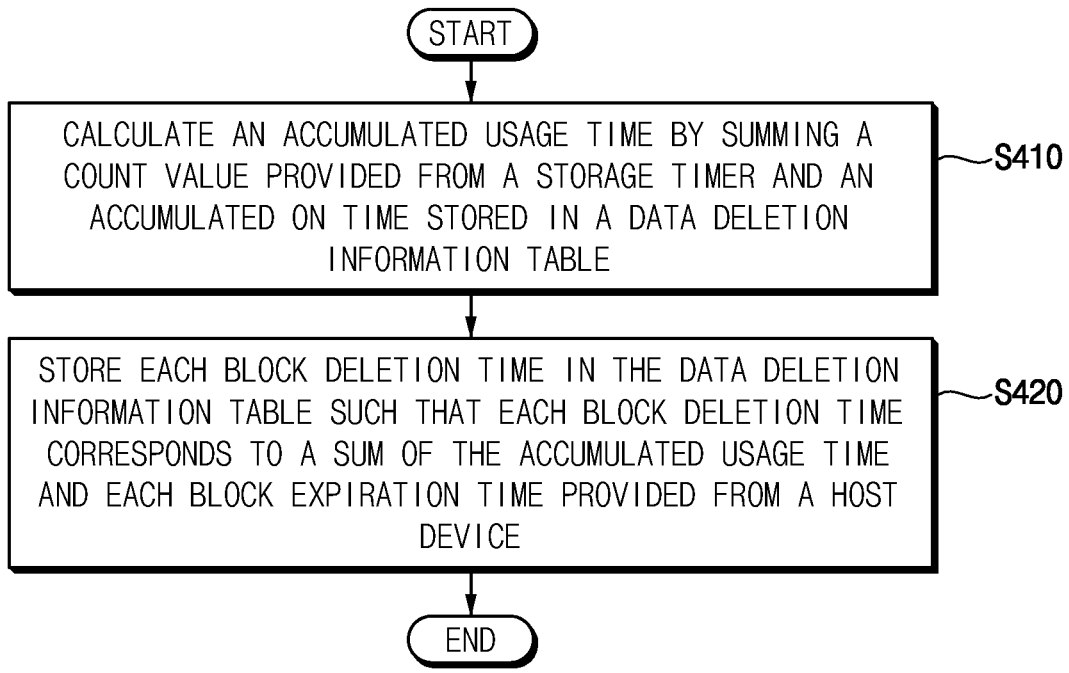
FIGS. 11 and 12 are diagrams illustrating a data management method of generating a data deletion information table in a storage system according to example embodiments.
Figure 12:
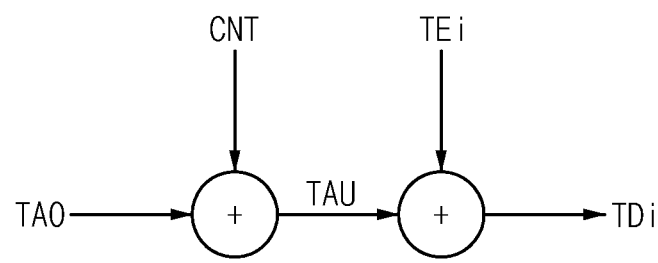

FIGS. 11 and 12 are diagrams illustrating a data management method of generating a data deletion information table of data management of a storage system according to example embodiments.

Referring to FIGS. 1, 5, 9, 10, 11 and 12, in operation S410, the data deletion manager DDM1 may calculate the accumulated usage time TAU by summing the count value CNT provided from the storage timer TMR 340 and the accumulated on time TAO stored in the data deletion information table DDIT. In this case, the accumulated usage time TAU may correspond to a time point when the block expiration time is received from the host device 200.

In operation S420, the data deletion manager DDM1 may store each block deletion time TDi (i=1, 2, 3, 4) in the data deletion information table DDIT such that each block deletion time TDi corresponds to a sum of the accumulated usage time TAU and each block expiration time TEi provided from the host device 200.

Figure 13:
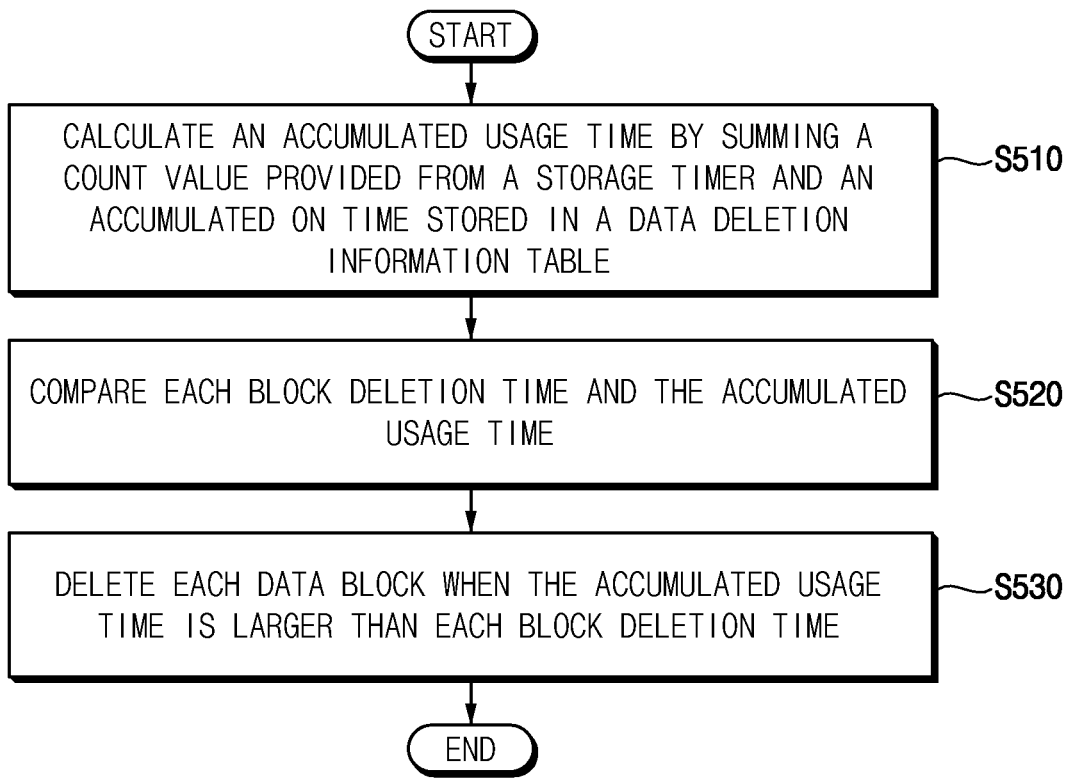
FIGS. 13 and 14 are diagrams illustrating a data management method of deleting data blocks in a storage system according to example embodiments.
Figure 14:
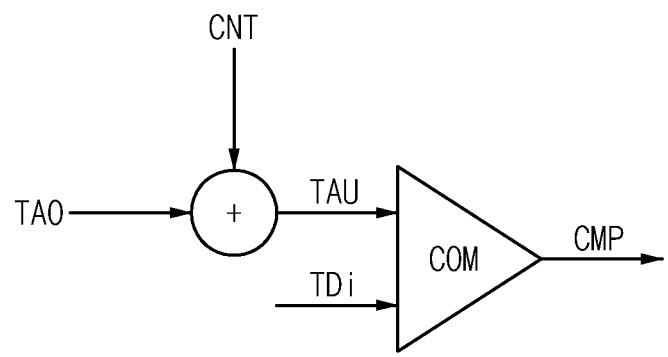

FIGS. 13 and 14 are diagrams illustrating a data management method of deleting data blocks of a storage system according to example embodiments.

Referring to FIGS. 1, 5, 9, 10, 11, 12, 13 and 14, in operation S510, the data deletion manager DDM1 may calculate the accumulated usage time TAU by summing the count value CNT provided from the storage timer TMR 340 and the accumulated on time TAO stored in the data deletion information table DDIT. In this case, the accumulated usage time TAU may correspond to a time point when the data deletion manager DDM1 determines whether to delete each data block DBi.

In operation S520, the data deletion manager DDM1 may compare each block deletion time TDi corresponding to each data block DBi and the accumulated usage time TAU. Based on such comparison results, the data deletion manager DDM1 may determine whether to delete of maintain each data block DBi.

In operation S530, the data deletion manager DDM1 may delete each data block DBi stored in the nonvolatile memory device NVM when the accumulated usage time TAU is greater than each block deletion time TDi. For deletion of each data block DBi, the data deletion manager DDM1 may provide the logic address corresponding to the data block to be deleted. The flash translation layer (FTL) of the storage controller 310 may convert the logic address to the physical address of the nonvolatile memory device NVM and delete the data block stored at the physical address.

Figure 15:
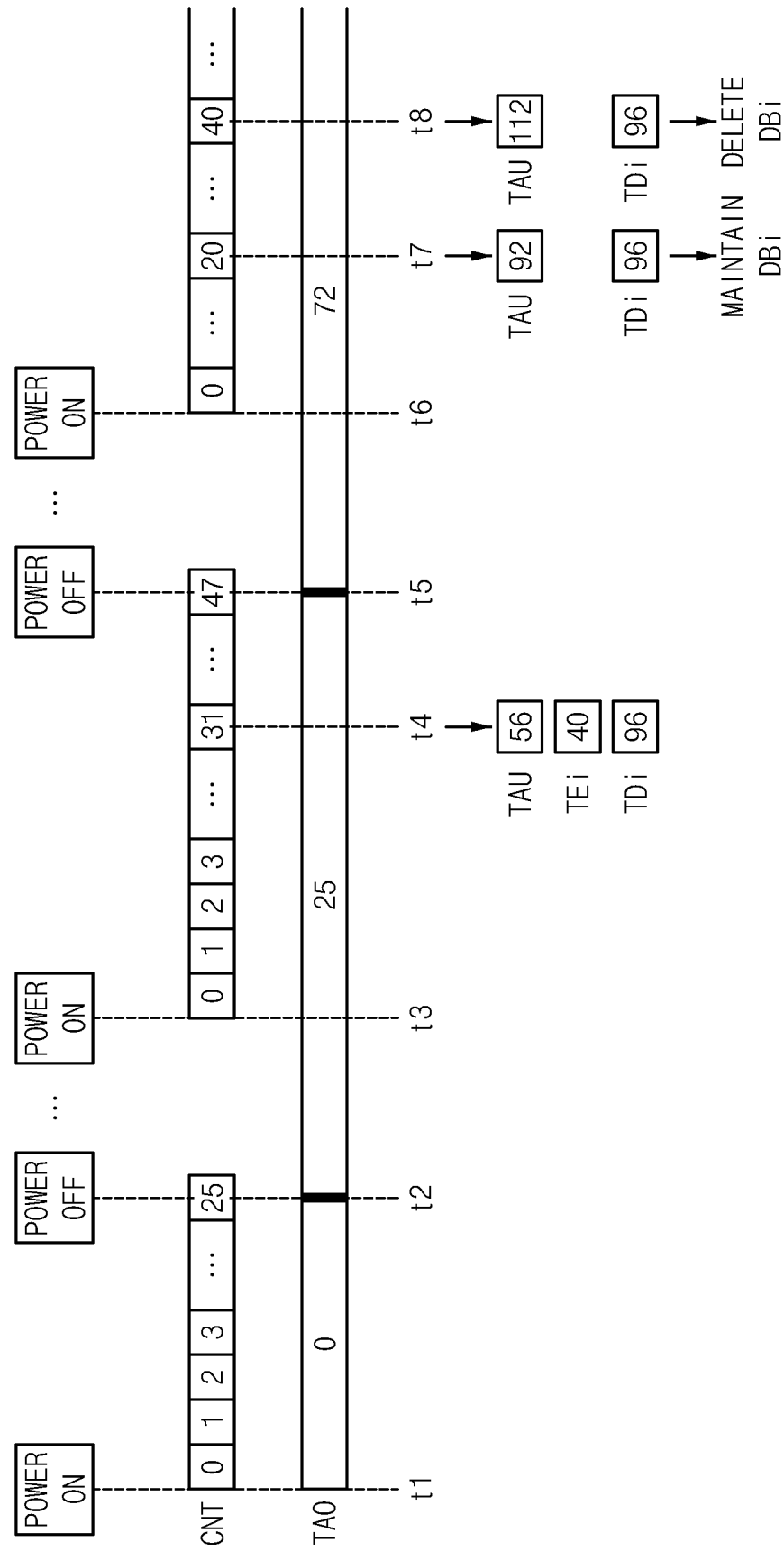
FIGS. 15 and 16 are diagrams illustrating a method of data management of a storage system according to example embodiments.
Figure 16:
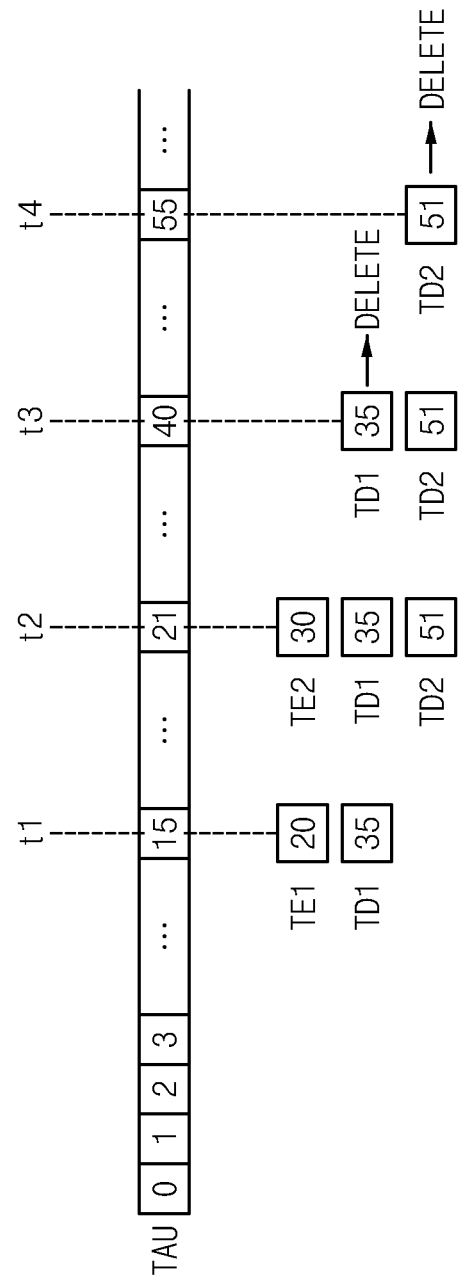

FIGS. 15 and 16 are diagrams illustrating a data management method of a storage system according to example embodiments. Hereinafter, descriptions repeated with FIGS. 9 through 14 may be omitted.

Referring to FIG. 15, at time point t4 when the block expiration time TEi corresponding to the data block DBi is transferred from the host device 200 to the first storage device 301, the count value CNT provided from the storage timer TMR 340 may correspond to 31 and the accumulated on time TAO may correspond to 25. Accordingly the block deletion time TDi at time point t4 may be determined as 56 by summing the accumulated usage time TAU of 31 and the accumulated on time TAO of 25. The block deletion time TDi at time point t4 may be determined as 96 by summing the accumulated usage time of 56 and the block expiration time TEi of 40.

In some example embodiments, the data deletion manager DDM1 may determine periodically whether to delete the plurality of data blocks included in the file. For example, as illustrated in FIG. 15, the data deletion manager DDM1 may determine at time points t7 and t8 whether to delete the plurality of data blocks based on the count value CNT provided from the storage timer TMR 340.

At time point t7, the accumulated usage time TAU of 92 is smaller than the block deletion time TDi of 96, and thus the data deletion manager DDM1 may maintain the data block DBi without deletion. At time point t8, the accumulated usage time TAU of 112 is greater than the block deletion time TDi of 96, and thus the data deletion manager DDM1 may delete the data block DBi.

FIG. 16 illustrates an example scenario for data management using only the accumulated usage time TAU described above.

Referring to FIG. 16, at time point t1, the first storage device 301 may receive, from the host device 200, a request including the first block deletion time TE1 of 20 corresponding to the first data block DB1. The data deletion manager DDM1 may determine the first block deletion time TD1 of 35 at time point t1 by summing the accumulated usage time TAU of 15 and the first block expiration time TE1 of 20. In the same way, the data deletion manager DDM1 may determine the second block deletion time TD2 of 51 at time point t2 by summing the accumulated usage time TAU of 21 and the second block expiration time TE2 of 30. As described above, the first block expiration time TE1 and the second block expiration time TE2 may be determined by the file system FS of the host device 200.

At time point t3, the accumulated usage time TAU of 40 is greater than the first block deletion time TD1 of 35 and thus the data deletion manager DDM1 may delete the first data block DB1. In contrast, the accumulated usage time TAU 40 is smaller than the second block deletion time TD2 of 51 and thus the data deletion manager DDM1 may maintain the second data block DB2 without deletion.

At time point t4, the accumulated usage time TAU of 55 is greater than the second block deletion time TD2 of 51 and thus the data deletion manager DDM1 may delete the second data block DB2.

As such, the storage device, the storage system and the method of data management according to example embodiments may enhance performance and lifetime of the storage system by deleting the expired data by units of data block efficiently and automatically without the control of the host device.

Figure 17:
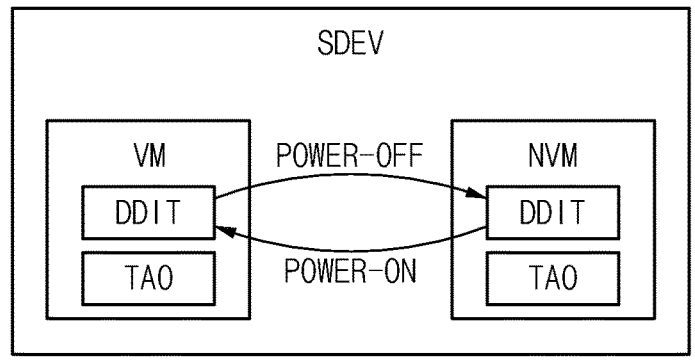
FIG. 17 is a diagram illustrating a backup operation and a loading operation of a storage system according to example embodiments.

FIG. 17 is a diagram illustrating a backup operation and a loading operation of a storage system according to example embodiments.

Referring to FIG. 17, a storage device SDEV may include a nonvolatile memory device NVM and a volatile memory VM. For example, the volatile memory VM may be the buffer memory 330 in FIG. 1.

The data deletion manager DDM1 in FIG. 1 may backup the data deletion information table DDIT from the volatile memory device VM to the nonvolatile memory device NVM when the first storage device 301 is powered off. In addition the data deletion manager DDM1 may load the data deletion information table DDIT from the nonvolatile memory device NVM to the volatile memory device VM when the first storage device 301 is powered on.

During the power-on state, the data deletion information table DDIT may be stored in the volatile memory device VM that has a relatively high operation speed for efficient update and management of information. The information may be stored in the nonvolatile memory device NVM during the power-off state for consistency of information.

In some example embodiments, also the accumulated on time TAO may be backed up in the nonvolatile memory device NVM when the first storage device 301 is powered off and then loaded to the volatile memory device VM when the first storage device 301 is powered on.

Figure 18:
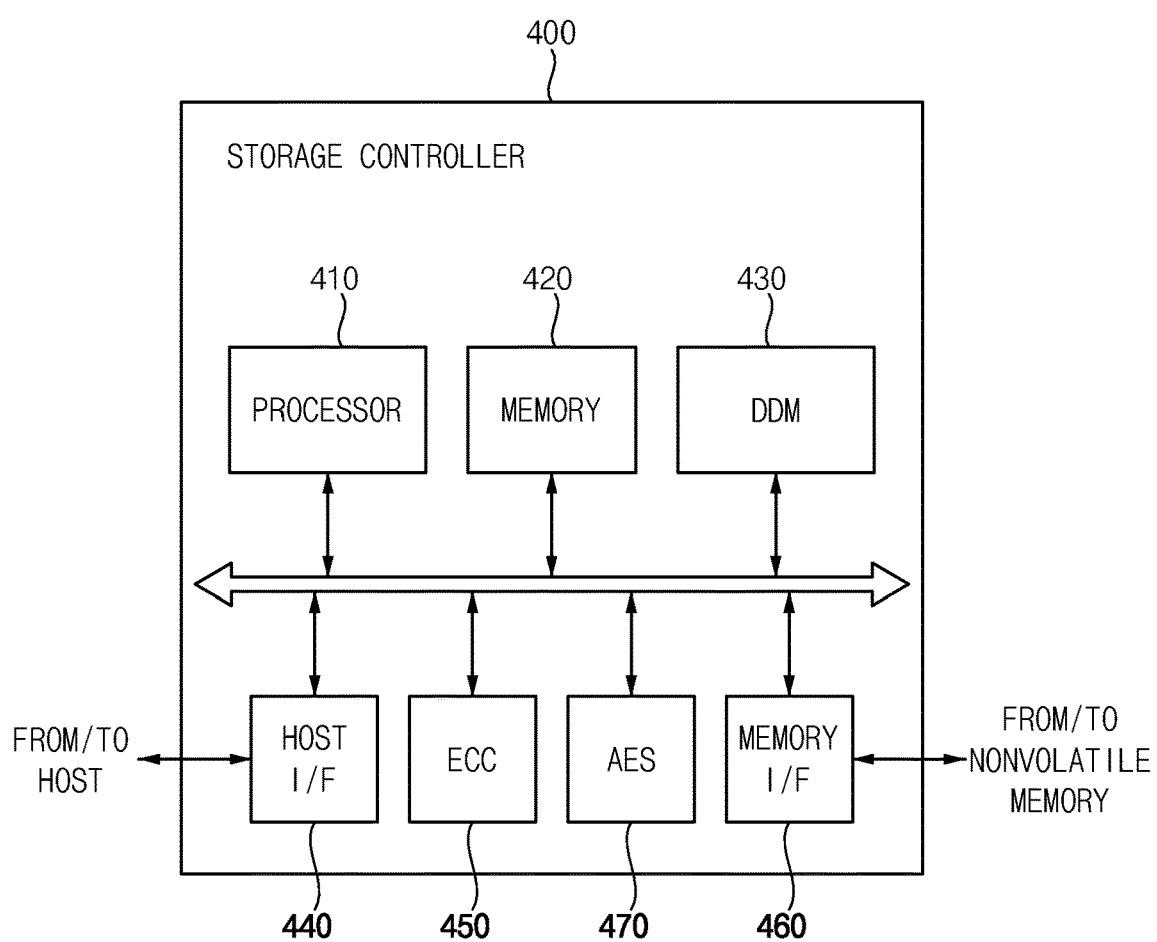
FIG. 18 is a block diagram illustrating a storage controller included in a storage system according to example embodiments.

FIG. 18 is a block diagram illustrating a storage controller included in a storage system according to example embodiments.

Referring to FIG. 18, a storage controller 400 may include a processor 410, a memory 420, a data deletion manager DDM 430, a host interface (I/F) 440, an error correction code (ECC) engine 450, a memory interface (I/F) 460 and an advanced encryption standard (AES) engine 470.

According to an example embodiment, the processor 410 may control an operation of the storage controller 400 based on a command received via the host interface 440 from a host device. For example, the processor 410 may control an operation of the storage controller 400 in response to a command received via the host interface 440 from a host device (e.g., the host device 200 in FIG. 1). For example, the processor 410 may control an operation of a storage device (e.g., the first storage device 301 in FIG. 1), and may control respective components by employing firmware for operating the storage device.

The memory 420 may store instructions and data executed and processed by the processor 410. For example, the memory 420 may be implemented with a volatile memory, such as a DRAM, a SRAM, a cache memory, or the like.

The data deletion manager 430 may control the deletion by units of data block as described above. The data deletion manager 430 may generate the data deletion information table including a plurality of block deletion times respectively corresponding to a plurality of data blocks included in a file, and delete each data block based on the data deletion information table.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device and the storage device. The host interface 440 may provide an interface corresponding to a bus format of the host device for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), an SATA, a nonvolatile memory (NVM) express (NVMe), etc., format.

The memory interface 460 may communicate data with a nonvolatile memory (e.g., the nonvolatile memories 320a, 320b and 320c in FIG. 2). The memory interface 460 may transfer data to the nonvolatile memory, or may receive data read from the nonvolatile memory. In some example embodiments, the memory interface 460 may be connected to the nonvolatile memory via one channel. In other example embodiments, the memory interface 460 may be connected to the nonvolatile memory via two or more channels. For example, the memory interface 460 may be configured to comply with a standard protocol, such as Toggle or open NAND flash interface (ONFI).

The AES engine 470 may perform at least one of an encryption operation and a decryption operation on data input to the storage controller 400 using a symmetric-key algorithm. The AES engine 470 may include an encryption module and a decryption module. For example, the encryption module and the decryption module may be implemented as separate modules. For another example, one module capable of performing both encryption and decryption operations may be implemented in the AES engine 470.

Figure 19:
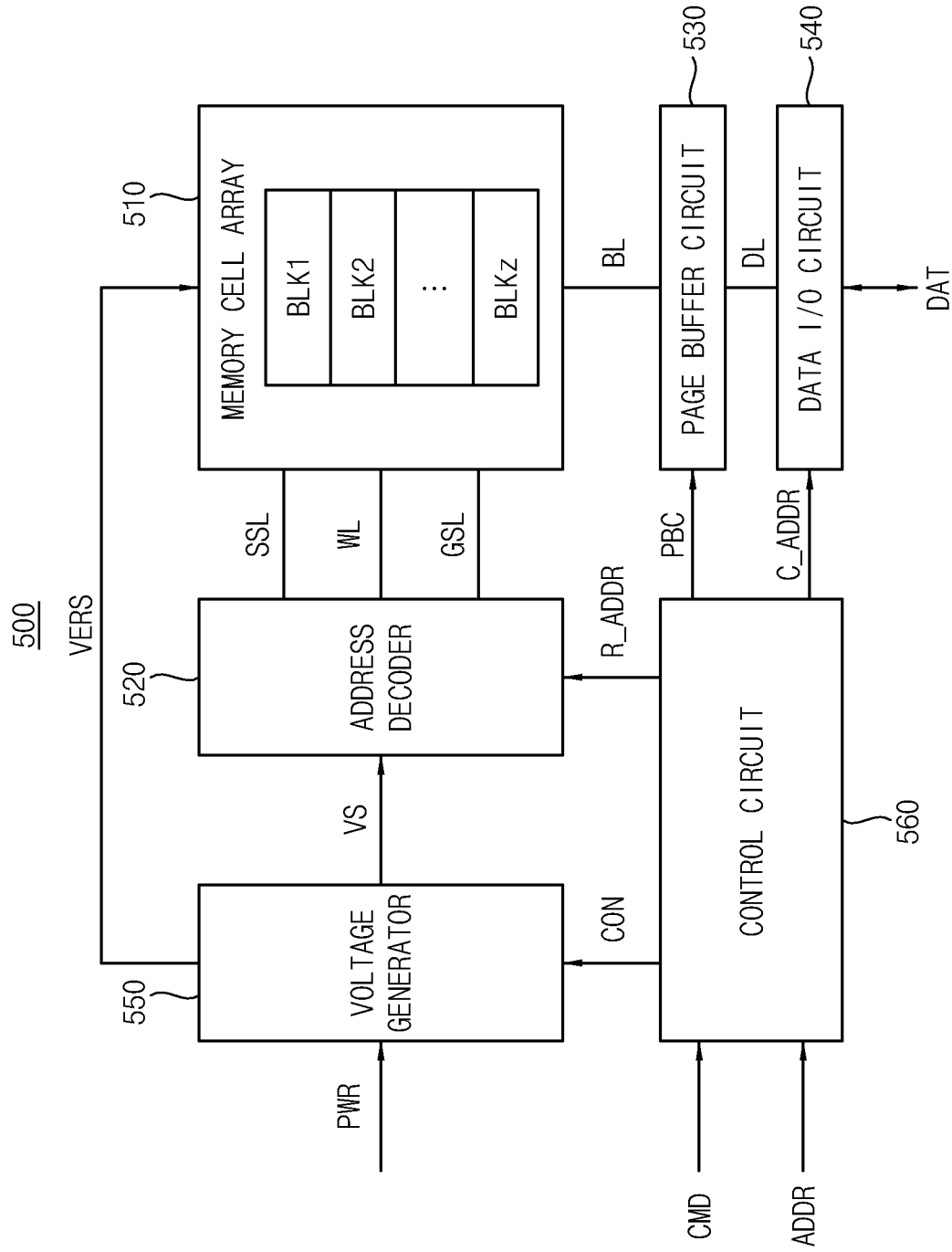
FIG. 19 is a block diagram illustrating a nonvolatile memory device included in a storage system according to example embodiments.

FIG. 19 is a block diagram illustrating an example embodiment of a nonvolatile memory device included in a storage system according to example embodiments.

Referring to FIG. 19, a nonvolatile memory 500 includes a memory cell array 510, an address decoder 520, a page buffer circuit 530, a data I/O circuit 540, a voltage generator 550 and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz, each of which includes memory cells. In addition, each of the plurality of memory blocks BLK1, BLK2, . . . , BLKz may be divided into a plurality of pages.

In some example embodiments, the plurality of memory cells included in the memory cell array 510 may be arranged in a two-dimensional (2D) array structure or a three-dimensional (3D) vertical array structure. The memory cell array of the 3D vertical array structure will be described below with reference to FIG. 21.

The control circuit 560 receives a command CMD and an address ADDR from an outside (e.g., from the storage controller 310 in FIG. 1), and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine at least one of the plurality of wordlines WL as a selected wordline, and may determine the remaining wordlines, other than the selected wordline, as unselected wordlines, based on the row address R_ADDR.

In addition, in the data erase/write/read operations, the address decoder 520 may determine at least one of the plurality of string selection lines SSL as a selected string selection line, and may determine the remaining string selection lines, other than the selected string selection line, as unselected string selection lines, based on the row address R_ADDR.

Further, in the data erase/write/read operations, the address decoder 520 may determine at least one of the plurality of ground selection lines GSL as a selected ground selection line, and may determine the remaining ground selection lines, other than the selected ground selection line, as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage that is required for the data erase operation based on the power PWR and the control signals CON. The erase voltage may be applied to the memory cell array 510 directly or via the bitline BL.

For example, during the erase operation, the voltage generator 550 may apply the erase voltage to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed (i.e., read) from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Although the nonvolatile memory is described based on a NAND flash memory, example embodiments are not limited thereto, and the nonvolatile memory may be any nonvolatile memory, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

Figure 20:
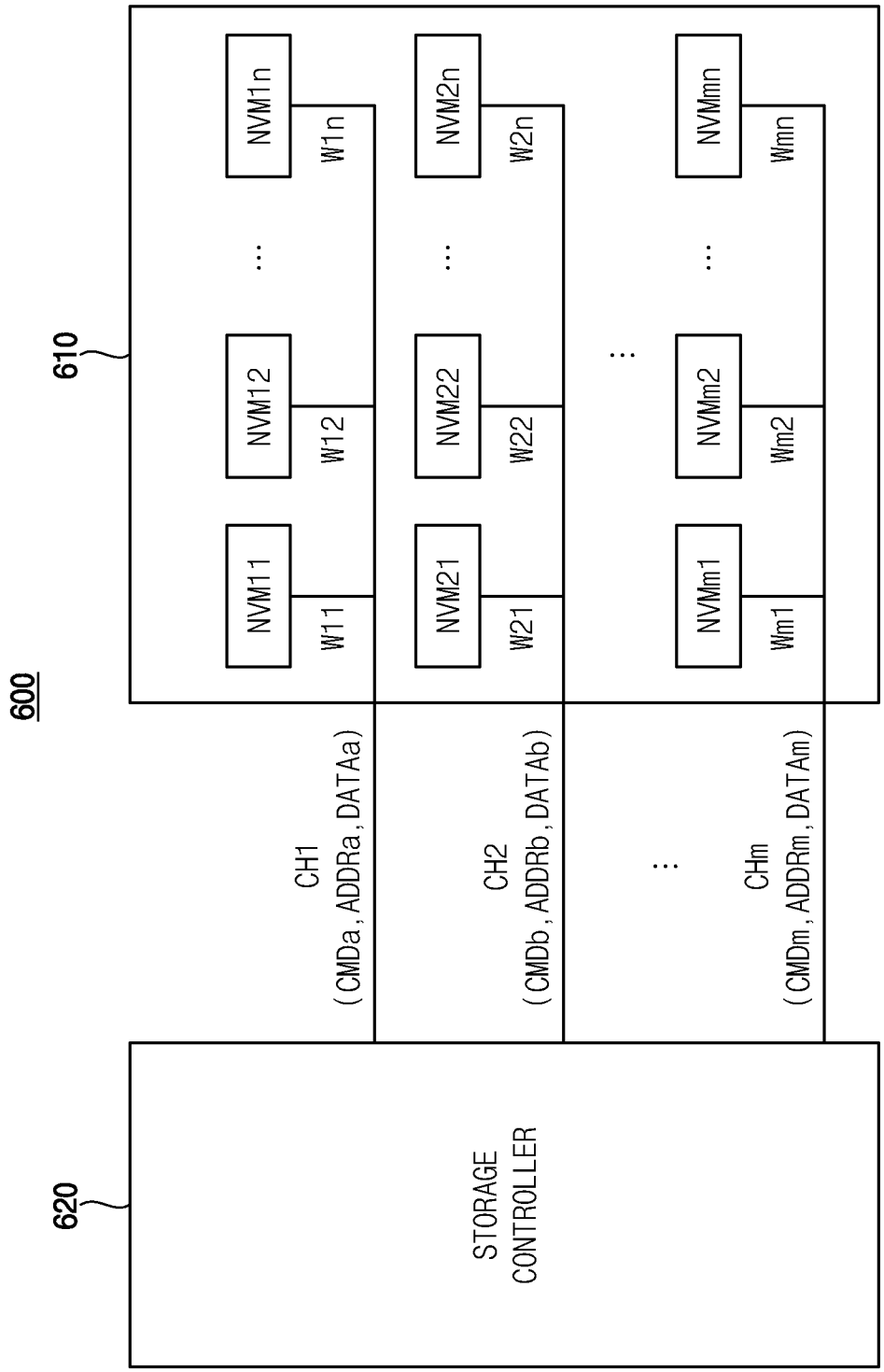
FIG. 20 is a block diagram illustrating a storage device according to example embodiments.

FIG. 20 is a block diagram illustrating a storage device according to example embodiments.

Referring to FIG. 20, a storage device 600 may include a memory device 610 and a memory controller 620. The storage device 600 may support a plurality of channels CH1, CH2, . . . , CHm, and the memory device 610 may be connected to the memory controller 620 through the plurality of channels CH1 to CHm. For example, the storage device 600 may be implemented as a storage device, such as a universal flash storage (UFS), a solid state drive (SSD), or the like.

The memory device 610 may include a plurality of nonvolatile memories NVM11, NVM12, . . . , NVM1n, NVM21, NVM22, . . . , NVM2n, NVMm1, NVMm2, . . . , NVMmn. For example, the nonvolatile memories NVM11 to NVMmn may correspond to the nonvolatile memory device 320a, 320b and 320c in FIG. 1. Each of the nonvolatile memories NVM11 to NVMmn may be connected to one of the plurality of channels CH1 to CHm through a way corresponding thereto. For instance, the nonvolatile memories NVM11 to NVM1n may be connected to the first channel CH1 through ways W11, W12, . . . , W1n, the nonvolatile memories NVM21 to NVM2n may be connected to the second channel CH2 through ways W21, W22, . . . , W2n, and the nonvolatile memories NVMm1 to NVMmn may be connected to the m-th channel CHm through ways Wm1, Wm2, . . . , Wmn. In some example embodiments, each of the nonvolatile memories NVM11 to NVMmn may be implemented as a memory unit that may operate according to an individual command from the memory controller 620. For example, each of the nonvolatile memories NVM11 to NVMmn may be implemented as a chip or a die, but example embodiments are not limited thereto.

The memory controller 620 may transmit and receive signals to and from the memory device 610 through the plurality of channels CH1 to CHm. For example, the memory controller 620 may correspond to the storage controller 310 in FIG. 1. For example, the memory controller 620 may transmit commands CMDa, CMDb, . . . , CMDm, addresses ADDRa, ADDRb, . . . , ADDRm and data DATAa, DATAb, . . . , DATAm to the memory device 610 through the channels CH1 to CHm, or may receive the data DATAa to DATAm from the memory device 610 through the channels CH1 to CHm.

The memory controller 620 may select one of the nonvolatile memories NVM11 to NVMmn, which is connected to each of the channels CH1 to CHm, using a corresponding one of the channels CH1 to CHm, and may transmit and receive signals to and from the selected nonvolatile memory. For example, the memory controller 620 may select the nonvolatile memory NVM11 from among the nonvolatile memories NVM11 to NVM1n connected to the first channel CH1. The memory controller 620 may transmit the command CMDa, the address ADDRa and the data DATAa to the selected nonvolatile memory NVM11 through the first channel CH1 or may receive the data DATAa from the selected nonvolatile memory NVM11 through the first channel CH1.

The memory controller 620 may transmit and receive signals to and from the memory device 610 in parallel through different channels. For example, the memory controller 620 may transmit the command CMDb to the memory device 610 through the second channel CH2 while transmitting the command CMDa to the memory device 610 through the first channel CH1. For example, the memory controller 620 may receive the data DATAb from the memory device 610 through the second channel CH2 while receiving the data DATAa from the memory device 610 through the first channel CH1.

The memory controller 620 may control overall operations of the memory device 610. The memory controller 620 may transmit a signal to the channels CH1 to CHm and may control each of the nonvolatile memories NVM11 to NVMmn connected to the channels CH1 to CHm. For example, the memory controller 620 may transmit the command CMDa and the address ADDRa to the first channel CH1 and may control one selected from among the nonvolatile memories NVM11 to NVM1n.

Each of the nonvolatile memories NVM11 to NVMmn may operate under the control of the memory controller 620. For example, the nonvolatile memory NVM11 may program the data DATAa based on the command CMDa, the address ADDRa and the data DATAa provided from the memory controller 620 through the first channel CH1. For example, the nonvolatile memory NVM21 may read the data DATAb based on the command CMDb and the address ADDRb provided from the memory controller 620 through the second channel CH2 and may transmit the read data DATAb to the memory controller 620 through the second channel CH2.

Although FIG. 19 illustrates an example where the memory device 610 communicates with the memory controller 620 through m channels and includes n nonvolatile memories corresponding to each of the channels, example embodiments are not limited thereto and the number of channels and the number of nonvolatile memories connected to one channel may be variously changed.

Figure 21:
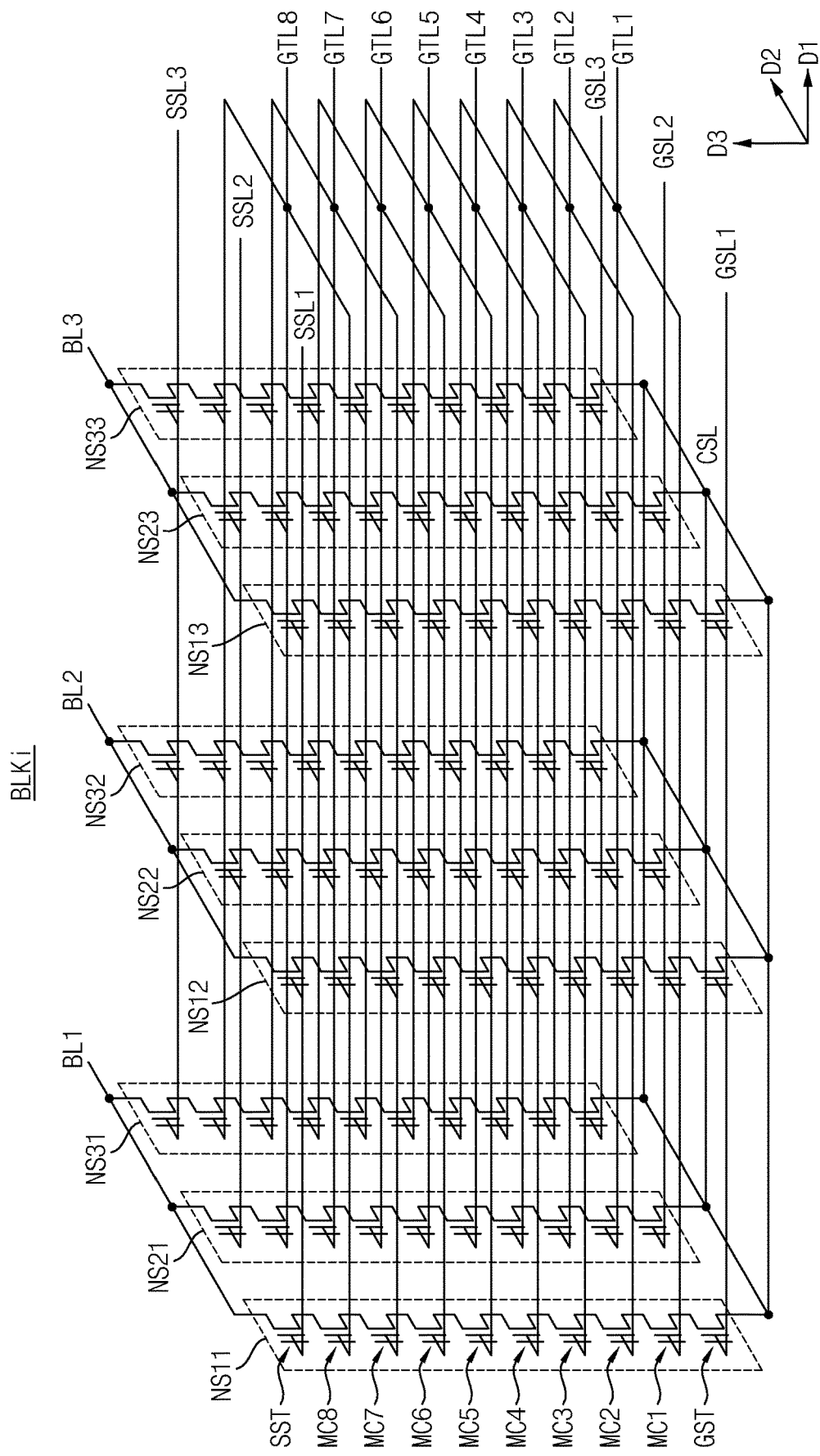
FIG. 21 is a circuit diagram illustrating an equivalent circuit of a memory block included in a nonvolatile memory device included in a storage system according to example embodiments.

FIG. 21 is a circuit diagram illustrating an equivalent circuit of a memory block included in a nonvolatile memory device included in a storage system according to example embodiments.

Referring to FIG. 21, each memory block BLKi included in a memory cell array 510 in FIG. 19 may be formed on a substrate in a three-dimensional structure (or a vertical structure). For example, NAND strings or cell strings included in the memory block BLKi may be formed in a vertical direction D3 perpendicular to an upper surface of a substrate. A first direction D1 and a second direction D2 are parallel to the upper surface of the substrate.

The memory block BLKi may include NAND strings NS11 to NS33 coupled between bitlines BL1, BL2, and BL3 and a common source line CSL. Each of the NAND strings NS11 to NS33 may include a string selection transistor SST, a memory cells MCI to MC8, and a ground selection transistor GST. In FIG. 21, each of the NAND strings NS11 to NS33 is illustrated to include eight memory cells MC1 to MC8. However, embodiments are not limited thereto, and each of the NAND strings NS11 to NS33 may include various numbers of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same height may be commonly connected, and the ground selection lines GSL1 to GSL3 and the string selection lines SSL1 to SSL3 may be separated. In FIG. 21, the memory block BLKi is illustrated as being coupled to eight gate lines GTL1 to GTL8 and three bitlines BL1 to BL3. However, example embodiments are not limited thereto, and each memory block in the memory cell array 510 may be coupled to various numbers of wordlines and various numbers of bitlines.

Figure 22:
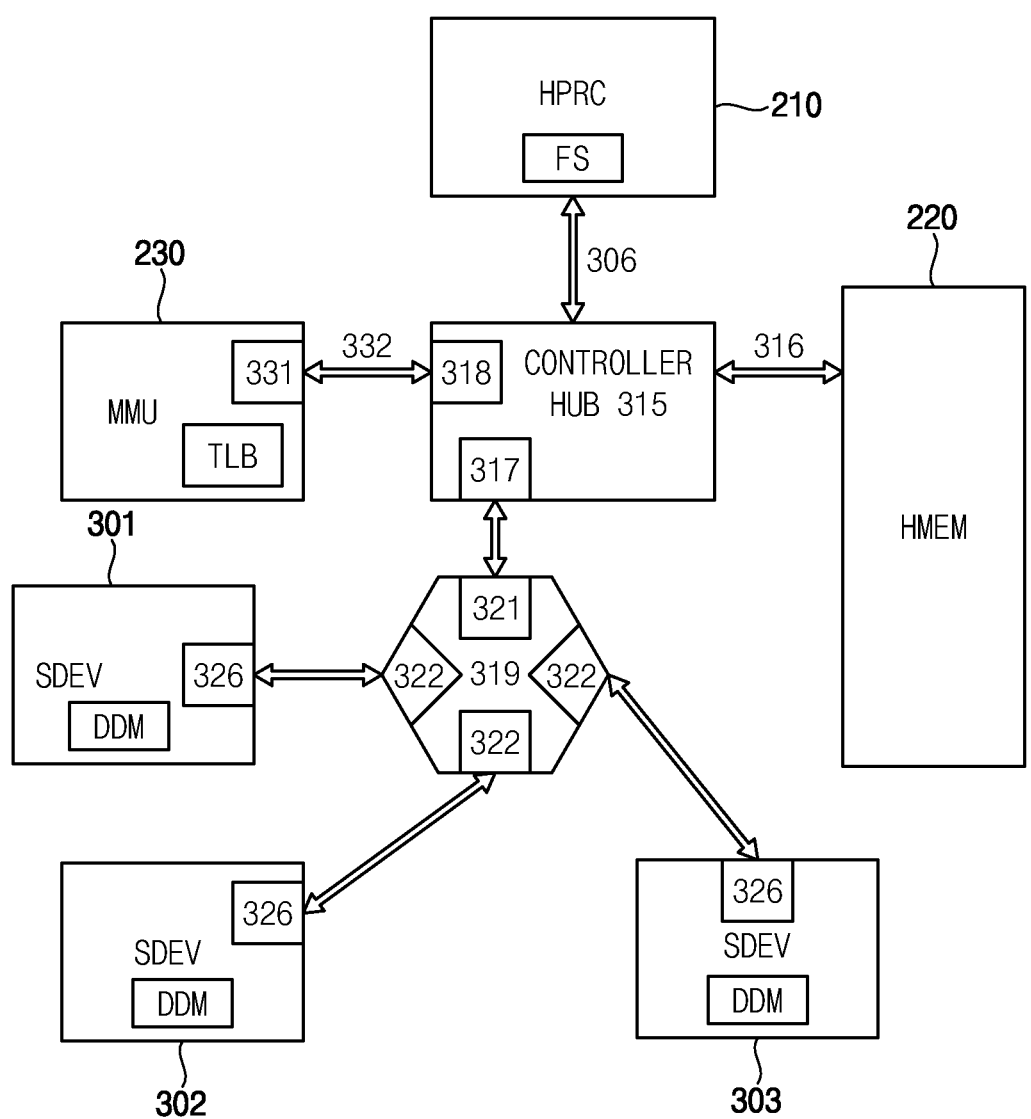
FIG. 22 is a block diagram illustrating an interconnect architecture of a storage system according to example embodiments.

FIG. 22 is a block diagram illustrating an example embodiment of an interconnect architecture of a storage system according to example embodiments.

Referring to FIG. 22, an example embodiment of a design composed of point-to-point links that interconnect a set of components is illustrated. A system 102 includes host processor HPRC 210, a host memory device (or a system memory) HMEM 220 and a memory management unit MMU 230 coupled to a controller hub 315. The host processor 210 includes any processing element, such as a microprocessor, a host processor, an embedded processor, a co-processor, or other processor. The host processor 210 is coupled to the controller hub 315 through a front-side bus (FSB) 306. In one example embodiment, the FSB 306 is a serial point-to-point interconnect. In another example embodiment, the FSB 306 includes a serial, differential interconnect architecture that is compliant with a different interconnect standard.

The system memory 220 includes any memory device, such as random access memory (RAM), non-volatile (NV) memory, solid state memory, or other memory accessible by devices in the system 300. The system memory 220 is coupled to the controller hub 315 through a memory interface 316. Examples of a memory interface include a double-data rate (DDR) memory interface, a dual-channel DDR memory interface, and a dynamic RAM (DRAM) memory interface.

In one example embodiment, the controller hub 315 is a root hub, root complex, or root controller in a Peripheral Component Interconnect Express (PCIe or PCIE) interconnection hierarchy. Examples of the controller hub 315 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with the host processor 210, while the controller hub 315 is used to communicate with I/O devices, in a similar manner as described below In some example embodiments, peer-to-peer routing is optionally supported through the root complex or the controller hub 315.

Here, the controller hub 315 is coupled to a switch 319 through a serial link. Input/output modules 317 and 321, which may also be referred to as interfaces/ports 317 and 321, include/implement a layered protocol stack to provide communication between the controller hub 315 and the switch 319. In one example embodiment, multiple devices are capable of being coupled to the switch 319. The switch 319 may be referred to as a bridge.

The switch 319 routes packets/messages from storage devices 301, 302 and 303 upstream, i.e. up a hierarchy towards a root complex, to the controller hub 315 and downstream, i.e. down a hierarchy away from a root controller, from the processor 210 or the system memory 220 to the storage devices 301, 302 and 303. The switch 319, in one example embodiment, is referred to as a logical assembly of multiple virtual PCI-to-PCI bridge devices. The storage devices 301, 302 and 303 include any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device, is referred to as an endpoint. Although not specifically shown, the storage devices 301, 302 and 303 may include a PCIe to PCI/PCI-X bridge to support legacy or other version PCI devices. Endpoint devices in PCIe are often classified as legacy, PCIe, or root complex integrated endpoints.

The memory management unit 230 is also coupled to the controller hub 315 through a serial link 332. The I/O modules 331 and 318 are used to implement a layered protocol stack to communicate between the memory management unit 230 and the controller hub 315.

The memory management unit 230 may include a translation look aside buffer (TLB) configured to store the address mapping information referenced recently and/or frequently.

As described above, the file system FS of the processor 210 may generate the data expiration information DEI including each block expiration time corresponding to each data block, and provide the data expiration information DEI to the storage devices 301, 302 and 303 through the controller hub 315 and the switch 319. The storage devices 301, 302 and 303 may include the data deletion manager DDM as described above to perform the deletion by units of data block.

Figure 23:
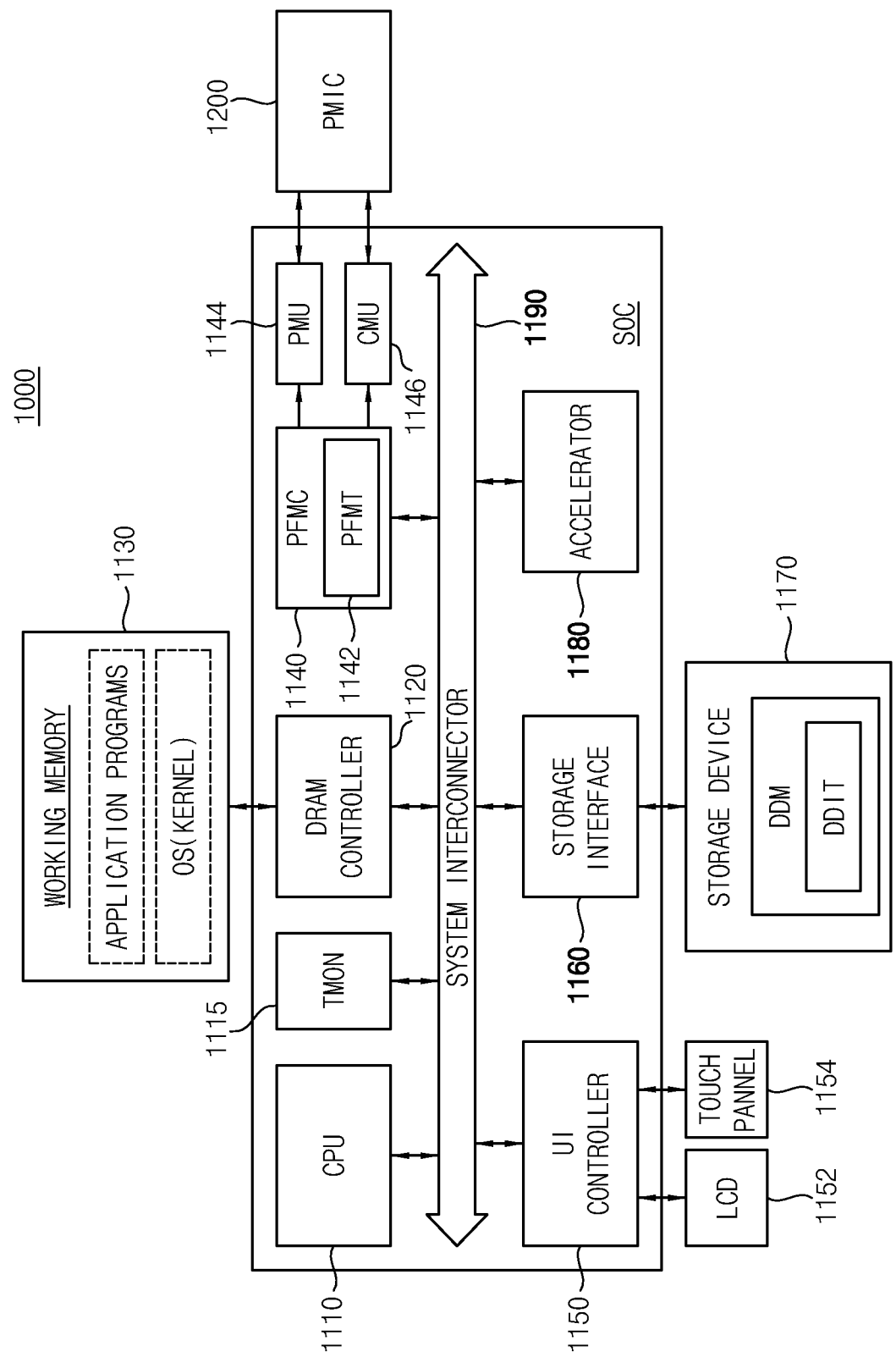
FIG. 23 is a block diagram illustrating a multi-core system according to example embodiments.

FIG. 23 is a block diagram illustrating a multi-core system according to example embodiments.

Referring to FIG. 23, a multi-core system 1000 may include a system on chip (SoC), a working memory 1130, a display device (LCD) 1152, a touch panel 1154, a storage device 1170, a power management integrated circuit (PMIC) 1200, etc. The SoC may include a central processing unit (CPU) 1110, a task monitor circuit TMON 1115, a DRAM controller 1120, a performance controller 1140, a user interface controller (UI controller) 1150, a storage interface 1160, and an accelerator 1180, a power management unit (PMU) 1144, a clock management unit (CMU) 1146, etc. It will be understood that components of the multi-core system 1000 are not limited to the components shown in FIG. 23. For example, the multi-core system 1000 may further include a hardware codec for processing image data, a security block, and the like.

The CPU 1110 executes software (for example, an application program, an operating system (OS), and device drivers) for the multi-core system 1000. The CPU 1110 may execute the operating system (OS) which may be loaded into the working memory 1130. The CPU 1110 may execute various application programs to be driven on the operating system (OS). The CPU 1110 may be provided as a homogeneous multi-core processor or a heterogeneous multi-core processor. A multi-core processor is a computing component including at least two independently drivable processors (hereinafter referred to as "cores" or "processor cores"). Each of the cores may independently read and execute program instructions.

The processor cores of the CPU 1100 may be grouped into a plurality of clusters that operate with an independent driving clock and an independent driving voltage. The processor cores in the same cluster may be included in a clock domain operating based on the same clock signal and/or in a power domain operating based on the same driving voltage. The driving voltage and/or the clock signal provided to each of the processor cores may be cut off or connected in units of single cores.

A kernel of the operating system (OS) may monitor the number of tasks in a task queue and the driving voltage and the driving clock of the CPU 1110 at specific time intervals to control the CPU 1110. In addition, a kernel of the operating system (OS) may control hotplug-in or hotplug-out of the CPU 1110 with reference to the monitored information. As such, as discussed in more detail below with reference to FIG. 31, a DVFS module and a frequency control module may be provided as a portion of the kennel.

The DRAM controller 1120 provides interfacing between the working memory 1130 and the system-on-chip (SoC). The DRAM controller 1120 may access the working memory 1130 according to a request of the CPU 1110 or another intellectual property (IP) block.

The operating system (OS) or basic application programs may be loaded into the working memory 1130 during a booting operation. For example, an OS image stored in the storage device 1170 is loaded into the working memory 1130 based on a booting sequence during booting of the multi-core system 1000. Overall input/output operations of the multi-core system 1000 may be supported by the operating system (OS). The working memory 1130 may be a volatile memory such as a static random access memory (SRAM) and a dynamic random access memory (DRAM) or a nonvolatile memory device such as a phase-change random-access memory (PRAM), a magnetoresistive random-access memory (MRAM), a resistive random-access memory (ReRAM), a ferroelectric random-access memory (FRAM), and a NOR flash memory.

The performance controller 1140 may adjust operation parameters of the system-on-chip (SoC) according to a control request provided from the kernel of the operating system (OS). For example, the performance controller 1140 may adjust the level of DVFS to enhance performance of the system-on-chip (SoC). Alternatively, the performance controller 1140 may generate the frequency selection signals to control the frequencies of the processor cores according to a request of the kernel. In this case, the performance controller 1140 may include a performance table PFMT 1142 to set a driving voltage and a frequency of a driving clock therein. The performance controller 1140 may control the PMU 1144 and the CMU 1146, which together form a power managing circuit, connected to the PMIC 1200 to provide the determined driving voltage and the determined driving clock to each power domain.

The user interface controller 1150 controls user input and output from user interface devices. For example, the user interface controller 1150 may display a keyboard screen for inputting data to the LCD 1152 according to the control of the CPU 1110. Alternatively, the user interface controller 1150 may control the LCD 1152 to display data that a user requests. The user interface controller 1150 may decode data provided from user input means, such as a touch panel 1154, into user input data.

The storage interface 1160 accesses the storage device 1170 according to a request of the CPU 1110. For example, the storage interface 1160 provides interfacing between the system-on-chip (SoC) and the storage device 1170. For example, data processed by the CPU 1110 is stored in the storage device 1170 through the storage interface 1160. Alternatively, data stored in the storage device 1170 may be provided to the CPU 1110 through the storage interface 1160.

The storage device 1170 is provided as a storage medium of the multi-core system 1000. The storage device 1170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 1170 may include a next-generation nonvolatile memory such as PRAM, MRAM, ReRAM, and FRAM or a NOR-type flash memory.

The accelerator 1180 may be provided as a separate intellectual property (IP) component to increase processing speed of a multimedia or multimedia data. For example, the accelerator 1180 may be provided as an intellectual property (IP) component to enhance processing performance of a text, audio, still images, animation, video, two-dimensional data or three-dimensional data.

A system interconnector 1190 may be a system bus to provide an on-chip network in the system-on-chip (SoC). The system interconnector 1190 may include, for example, a data bus, an address bus, and a control bus. The data bus is a data transfer path. A memory access path to the working memory 1130 or the storage device 1170 may also be provided. The address bus provides an address exchange path between intellectual properties (IPs). The control bus provides a path along which a control signal is transmitted between intellectual properties (IPs). However, the configuration of the system interconnector 1190 is not limited to the above description and the system interconnector 190 may further include arbitration means for efficient management.

As described above, the file system, which is executed in the kernel of the OS by the CPU 1110, may generate the data expiration information DEI including each block expiration time corresponding to each data block, and provide the data expiration information DEI to the storage device 1170. The storage device 1170 may include the data deletion manager DDM to perform the deletion by units of data block based on the data deletion information table DDIT, as described above.

As will be appreciated by one skilled in the art, example embodiments may be embodied as a system, method, computer program product, or a computer program product embodied in one or more computer readable medium(s) having computer readable program code embodied thereon.

The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

Example embodiments of the disclosure may be applied to any electronic devices and systems. For example, the example embodiments of the disclosure may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

The foregoing is illustrative of example embodiments and is not to be construed as limiting thereof. Although a few example embodiments have been described, those skilled in the art will readily appreciate that many modifications are possible in the example embodiments without materially departing from the present disclosure.

What is claimed is:

1. A storage system comprising:
  a host device comprising a file system configured to:
    manage a file by dividing the file into a plurality of data blocks;
    separately set a plurality of block expiration times respectively corresponding to each of the plurality of data blocks in the file; and
    transfer the plurality of block expiration times after setting the plurality of plurality of block expiration times; and
  a storage device configured to store data, the storage device comprising:
    a nonvolatile memory device configured to store the plurality of data blocks from the host device;
    a storage timer configured to provide a count value by counting time; and
    a data deletion manager configured to:
      generate a data deletion information table comprising a plurality of block deletion times for deleting the plurality of data blocks based on the plurality of block expiration times from the host device, and
      delete each of the plurality of data blocks stored in the nonvolatile memory device based on the data deletion information table and the count value by providing a logic address corresponding to each of the plurality of data blocks to a flash translation layer (FTL) the storage device,
    wherein the FTL is configured to convert the logic address to a physical address of the nonvolatile memory device and delete a data block stored at the physical address,
    wherein the storage timer is further configured to provide the count value by initializing the count value to zero when the storage device is powered on to start counting time from a time point when the storage device is powered on, wherein the data deletion manager is further configured to:
store an accumulated on time in the data deletion information table by accumulating the count value when the storage device is powered off,
calculate an accumulated usage time by summing the count value provided from the storage timer and the accumulated on time stored in the data deletion information table,
calculate a first block deletion time, among the plurality of block deletion times, corresponding to a first data block, among the one or more of the plurality of data blocks by adding a first block expiration time to the accumulated usage time at a first time when the first block expiration time, among the plurality of block expiration times, corresponding to the first data block is received from the host device, and
delete the first data block when the accumulated usage time at a second time is greater than the first block deletion time.

2. The storage system of claim 1, wherein the host device is further configured to transfer a request to the storage device, the request comprising a logic address of a first data block, among the plurality of data blocks and a block expiration time, among the plurality of block expiration times, corresponding to the first data block, among the plurality of data blocks.

3. The storage system of claim 2, wherein the data deletion manager is further configured to store mapping relation between the logic address of the first data block and a block deletion time, among the plurality of block deletion times, corresponding to the first data block in the data deletion information table.

4. The storage system of claim 3, wherein the data deletion manager is further configured to delete the mapping relation between the logic address of the first data block and the block deletion time of the first data block, when the first data block stored in the nonvolatile memory device is deleted.

5. The storage system of claim 1, wherein the storage device is further configured to transfer a logic address of a deleted data block that is deleted from the nonvolatile memory device to the host device, and
wherein the host device comprises a file system configured to:
set the plurality of block expiration times, and
update metadata for the file based on the logic address of the deleted data block.

6. The storage system of claim 1, wherein a first block expiration time, among the plurality of block expiration times, indicates a valid usage time from a time point when a first data block, among the plurality of data blocks is stored in the nonvolatile memory device while the storage device is in a power-on state to a time point when the first data block is deleted from the nonvolatile memory device, and
wherein the data deletion manager is further configured to delete each of the plurality of data blocks stored in the nonvolatile memory device based on the valid usage time.

7. The storage system of claim 1, wherein the data deletion manager is further configured to:
store each of the block deletion times in the data deletion information table such that each of the block deletion times corresponds to a sum of the accumulated usage time and a respective block expiration time, among the plurality of block expiration times provided from the host device.

8. The storage system of claim 1, wherein the data deletion manager is further configured to:
compare each of the plurality of block deletion times and the accumulated usage time, and
delete the one or more of the plurality of data blocks based on a result of the comparing of each of the plurality of block deletion times and the accumulated usage time.

9. The storage system of claim 1, wherein the data deletion manager is further configured to determine periodically whether to delete each of the plurality of data blocks.

10. The storage system of claim 1, wherein the storage device further comprises a volatile memory device, and
wherein the data deletion manager is further configured to:
backup the data deletion information table from the volatile memory device to the nonvolatile memory device when the storage device is powered off, and
load the data deletion information table from the nonvolatile memory device to the volatile memory device when the storage device is powered on.

11. The storage system of claim 1, wherein the host device comprises a file system configured to determine whether the plurality of data blocks is to be deleted by one of deletion by units of file or deletion by units of data block, and
wherein the host device is further configured to transfer a request to the storage device when the file system determines the plurality of data blocks is to be deleted by the deletion by units of file, the request comprises logic addresses of the plurality of data blocks in the file and a file expiration time corresponding to the file.

12. The storage system of claim 11, wherein the data deletion manager is further configured to:
replace the plurality of block deletion times stored in the data deletion information table with the file expiration time when the request including the file expiration time is transferred from the host device, and
simultaneously delete the plurality of data blocks included in the file from the nonvolatile memory device based on the data deletion information table and the count value.

13. The storage system of claim 1,
wherein the host device comprises a file system,
wherein, when the file system is configured to change one or more of the block expiration times, the host device transfers a request including a new block expiration time received from the host device corresponding to the one or more of the block expiration times.

14. The storage system of claim 13, wherein the data deletion manager is further configured to update one or more of the block expiration times stored in the data deletion information table based on the new block expiration time provided from the host device.

15. A storage device comprising:
a nonvolatile memory device configured to store a file, which is divided into a plurality of data blocks by a host device;
a storage timer configured to provide a count value by counting time; and
a data deletion manager configured to:
generate a data deletion information table comprising a plurality of block deletion times for deleting the plurality of data blocks based on a plurality of block expiration times separately set respectively corresponding to each of the plurality of data blocks in the file by a file system the host device, and delete each of the plurality of data blocks stored in the nonvolatile memory device based on the data deletion information table and the count value by providing a logic address corresponding to each of the plurality of data blocks to a flash translation layer (FTL) the storage device, wherein the FTL is configured to convert the logic address to a physical address of the nonvolatile memory device and delete a data block stored at the physical address, wherein the storage timer is further configured to provide the count value by initializing the count value to zero when the storage device is powered on to start counting time from a time point when the storage device is powered on, wherein the data deletion manager is further configured to:
store an accumulated on time in the data deletion information table by accumulating the count value when the storage device is powered off,
calculate an accumulated usage time by summing the count value provided from the storage timer and the accumulated on time stored in the data deletion information table,
calculate a first block deletion time, among the plurality of block deletion times, corresponding to a first data block, among the one or more of the plurality of data blocks by adding a first block expiration time to the accumulated usage time at a first time when the first block expiration time, among the plurality of block expiration times, corresponding to the first data block is received from the host device, and
delete the first data block when the accumulated usage time at a second time is greater than the first block deletion time.

16. The storage device of claim 15, wherein the storage device configured to receive a request comprising a logic address of a first data block, among the plurality of data blocks and a block expiration time corresponding to the first data block, among the plurality of data blocks, and
wherein the data deletion manager is further configured to store mapping relation between the logic address of the first data block and a block deletion time corresponding to the first data block in the data deletion information table.

17. The storage device of claim 15, further comprising a volatile memory device,
wherein the data deletion manager is further configure to:
backup the data deletion information table from the volatile memory device to the nonvolatile memory device when the storage device is powered off, and
load the data deletion information table from the nonvolatile memory device to the volatile memory device when the storage device is powered on.

18. A method of data management of a storage system, comprising:
managing a file by a file system of a host device by dividing the file into a plurality of data blocks;
separately setting, by the file system of the host device, a plurality of block expiration times respectively corresponding to each of the plurality of data blocks in the file;
transferring, by the file system of the host device, the plurality of block expiration times after setting the plurality of plurality of block expiration times;
storing the plurality of data blocks in a nonvolatile memory device of a storage device;
obtaining a count value based on counting time;
generating a data deletion information table comprising a plurality of block deletion times for deleting the plurality of data blocks based on the plurality of block expiration times; and
deleting each of the plurality of data blocks stored in the nonvolatile memory device based on the data deletion information table and the count value by providing a logic address corresponding to each of the plurality of data blocks to a flash translation layer (FTL) the storage device; and
wherein the FTL is configured to convert the logic address to a physical address of the nonvolatile memory device and delete a data block stored at the physical address,
wherein the count value is further obtained by initializing the count value to zero when the storage device is powered on to start counting time from a time point when the storage device is powered on,
wherein the method further comprises:
storing an accumulated on time in the data deletion information table by accumulating the count value when the storage device is powered off,
calculating an accumulated usage time by summing the count value provided from the storage timer and the accumulated on time stored in the data deletion information table,
calculating a first block deletion time, among the plurality of block deletion times, corresponding to a first data block, among the one or more of the plurality of data blocks by adding a first block expiration time to the accumulated usage time at a first time when the first block expiration time, among the plurality of block expiration times, corresponding to the first data block is received from the host device, and
deleting the first data block when the accumulated usage time at a second time is greater than the first block deletion time.

* * * * *